US008830359B2

(12) United States Patent
Ito

(10) Patent No.: US 8,830,359 B2
(45) Date of Patent: Sep. 9, 2014

(54) IMAGE PROCESSING APPARATUS, IMAGING APPARATUS, AND COMPUTER READABLE MEDIUM

(75) Inventor: Yuichi Ito, Tokyo (JP)

(73) Assignee: Nikon Corporation, Tokyo (JP)

( * ) Notice: Subject to any disclaimer, the term of this patent is extended or adjusted under 35 U.S.C. 154(b) by 362 days.

(21) Appl. No.: 13/071,019

(22) Filed: Mar. 24, 2011

(65) Prior Publication Data

US 2011/0249151 A1 Oct. 13, 2011

(30) Foreign Application Priority Data

| Mar. 30, 2010 | (JP) | 2010-077977 |
| Sep. 27, 2010 | (JP) | 2010-215609 |
| Nov. 25, 2010 | (JP) | 2010-262746 |
| Feb. 22, 2011 | (JP) | 2011-035419 |

(51) Int. Cl.
*H04N 5/217* (2011.01)
*G06T 5/00* (2006.01)

(52) U.S. Cl.
CPC ...... *H04N 5/217* (2013.01); *G06T 2207/20016* (2013.01); *G06T 5/002* (2013.01)
USPC .......................................................... 348/241

(58) Field of Classification Search
USPC .................... 348/241; 382/275, 232, 107, 167
See application file for complete search history.

(56) References Cited

U.S. PATENT DOCUMENTS

| 5,982,415 | A * | 11/1999 | Sakata ........................ 348/14.12 |
| 6,724,932 | B1 * | 4/2004 | Ito .................................. 382/162 |
| 6,999,633 | B1 | 2/2006 | Kondo et al. |
| 2005/0265627 | A1 | 12/2005 | Yamauchi |
| 2008/0303952 | A1 * | 12/2008 | Nakayama ..................... 348/607 |
| 2009/0086062 | A1 * | 4/2009 | Tsuruoka ...................... 348/241 |
| 2010/0128147 | A1 * | 5/2010 | Chang et al. .................. 348/241 |
| 2010/0182462 | A1 * | 7/2010 | Utsugi .......................... 348/241 |

FOREIGN PATENT DOCUMENTS

| JP | A-07-079956 | 3/1995 |
| JP | A-2000-217126 | 8/2000 |
| JP | A-2000-232384 | 8/2000 |
| JP | A-2005-311575 | 11/2005 |
| JP | A-2005-347821 | 12/2005 |
| JP | A-2006-310999 | 11/2006 |
| JP | A-2007-335970 | 12/2007 |
| JP | A-2008-252767 | 10/2008 |
| JP | A-2008-306501 | 12/2008 |
| JP | A-2009-219066 | 9/2009 |

OTHER PUBLICATIONS

Jun. 12, 2012 Notification of Reasons for Refusal issued in Japanese Patent Application No. 2011-035419 (with translation).
Aug. 28, 2012 Japanese Office Action issued in Japanese Application No. 2010-215609 (with translation).
Oct. 30, 2012 Japanese Office Action issued in Application No. JP-A-2010-262746 (with translation).

* cited by examiner

*Primary Examiner* — Aung S Moe
*Assistant Examiner* — Amy Hsu
(74) *Attorney, Agent, or Firm* — Oliff PLC

(57) ABSTRACT

An image processing apparatus of the present application includes a reduced image generation section generating a first reduced image obtained by reducing at least a target image being a noise reduction target, out of the target image and a reference image to be a reference of a noise reduction processing, a noise extraction section extracting a noise component in a frequency band corresponding to a reduction ratio of the first reduced image by using at least the first reduced image, and a noise reduction section reducing the noise component in the frequency band from a pixel value of each pixel of the target image based on the noise component in the frequency band being extracted.

14 Claims, 21 Drawing Sheets

IMAGE PROCESSING APPARATUS, IMAGING APPARATUS, AND COMPUTER READABLE MEDIUM

CROSS REFERENCE TO RELATED APPLICATIONS

This application is based upon and claims the benefit of priorities from Japanese Patent Application Nos. 2010-077977, 2010-215609, 2010-262746, and 2011-035419, each filed on Mar. 30, 2010, Sep. 27, 2010, Nov. 25, 2010, and Feb. 22, 2011, the entire contents of which are incorporated herein by reference.

BACKGROUND

1. Field

The present application relates to an image processing apparatus, an imaging apparatus and a computer readable medium.

2. Description of the Related Art

Conventionally, noise reduction processing with respect to a moving image has been required to be performed in consideration of a motion of captured subject, in which since the number of flames to be processing targets is large, a calculation amount and a circuit scale are increased.

In order to solve those problems, for example, there has been developed a technology in which a motion part of a subject is detected based on a difference between frames of a moving image, a coefficient of filter for reducing noise is determined based on a detection result of the motion part of the subject, and thereby noise reduction is performed by correctly judging the motion and the noise in the flames (refer to Japanese. Unexamined Patent Application Publication No. H7-79956, and the like).

SUMMARY

However, the conventional technology has a problem that, when a noise intensity is high, even when a subject is not moved, a variation in pixel values of respective pixels is large, so that it becomes difficult to distinguish between a motion of the subject and a noise, resulting in that noise reduction cannot be properly conducted.

Further, in the conventional technology, although a filter coefficient is determined based on a detection result of a motion part of a subject, noise reduction of a current frame using the filter coefficient is performed through synthetic processing using simple weighting between the current frame and a noise-reduced past frame which is one frame before the current frame, so that an image of the subject may be blurred.

Further, in the conventional technology, since a filter coefficient is determined based only on a difference in pixel values between frames, there is a case where a noise cannot be correctly reduced from a pixel having a pixel value with a high noise level, such as a dark part of a subject, for example.

In view of the problems of the aforementioned conventional technologies, the present application has a proposition to provide a technology with which noise reduction with respect to a moving image and the like can be highly accurately performed.

In order to solve the aforementioned problems, an image processing apparatus of the present application includes a reduced image generation section generating a first reduced image obtained by reducing at least a target image being a noise reduction target, out of the target image and a reference image to be a reference of a noise reduction processing, a noise extraction section extracting a noise component in a frequency band corresponding to a reduction ratio of the first reduced image by using at least the first reduced image, and a noise reduction section reducing the noise component in the frequency band from a pixel value of each pixel of the target image based on the noise component in the frequency band being extracted.

Further, it is also possible that the reduced image generation section generates a pair of the first reduced image and a second reduced image obtained by reducing the reference image at a reduction ratio same as the reduction ratio of the first reduced image, at least one reduction ratio, and the noise extraction section extracts the noise component in the frequency band corresponding to the reduction ratio by using the first reduced image and the second reduced image.

Further, it is also possible that, when a plurality of pairs of the first reduced image and the second reduced image are generated at a plurality of reduction ratios, the noise extraction section sequentially extracts the noise component in the frequency band from a pair whose reduction ratio corresponds to a minimum reduction ratio.

Further, it is also possible that the noise extraction section performs a weighted average processing on a pixel value of each pixel of the first reduced image by using the first reduced image and the second reduced image, and extracts the noise component in the frequency band from a difference between the pixel value of each pixel and a weighted averaged pixel value of the first reduced image.

Further, it is also possible that the noise reduction section performs, by using the reference image and the target image from which the noise component in the frequency band is reduced, a weighted average processing on the pixel value of each pixel of the target image from which the noise component in the frequency band is reduced, and reduces a noise component in a high frequency band in each pixel of the target image.

Further, it is also possible to include a compression processing section performing an image compression on the target image from which the noise component in the frequency band is reduced, and reducing a noise component in a high frequency band.

Further, it is also possible that the noise reduction section integrates the noise component in the frequency bands extracted from each of the plurality of pairs at each pixel of the target image, and reduces the noise component being integrated from the pixel value of each pixel of the target image.

Further, it is also possible that, when the first reduced image is generated in plural in number at a plurality of reduction ratios, the noise extraction section sequentially extracts the noise component from the noise component in the frequency band corresponding to a minimum reduction ratio.

Further, it is also possible that the noise extraction section performs a weighted average processing on a pixel value of each pixel of the first reduced image, and extracts the noise component in the frequency band from a difference between the pixel value of each pixel and a weighted averaged pixel value of the first reduced image.

Further, it is also possible that the noise reduction section performs, by using the target image from which the noise component in the frequency band is reduced, a weighted average processing on the pixel value of each pixel of the target image from which the noise component in the frequency band is reduced, and reduces a noise component in a high frequency band in each pixel of the target image.

Further, it is also possible that the noise reduction section performs, by using the target image and the reference image, a weighted average processing on the pixel value of each pixel of the target image, and reduces a variation component in a time direction in each pixel of the target image.

Further, it is also possible that the noise reduction section reduces, in the reference image, the variation component in the time direction by using pixel values in an area in which a position of a pixel corresponding to each pixel of the target image is set as a center.

Further, it is also possible that the target image is one of continuously captured images, and the reference image is an image captured before the target image and applied the noise reduction out of the continuously captured images.

Further, it is also possible that the weighted average processing is performed by using either one of a bilateral filter and an epsilon filter.

An image processing apparatus of the present application includes a reduced image generation section generating a pair of a first reduced image obtained by reducing a target image being a noise reduction target and a second reduced image obtained by reducing a reference image to be a reference of a noise reduction processing at a same reduction ratio as a reduction ratio of the first reduced image, at least one reduction ratio, a motion judgment section judging whether or not a subject of the target image is moved based on a comparison between the first reduced image and the second reduced image, a noise extraction section extracting a noise component in a frequency band corresponding to the reduction ratio from the first reduced image and the second reduced image based on a judgment result made by the motion judgment section, and a noise reduction section reducing the noise component in the frequency band from the target image.

Further, it is also possible that, when a plurality of pairs of the first reduced image and the second reduced image are generated at a plurality of reduction ratios, the motion judgment section judges whether or not the subject is moved from a pair whose reduction ratio corresponds to a minimum reduction ratio, and the noise extraction section extracts the noise component in the frequency band from the pair whose reduction ratio corresponds to the minimum reduction ratio.

Further, it is also possible that the motion judgment section calculates a first average value and a second average value of pixel values in a target area in which a position of a pixel being a processing target of the first reduced image and the second reduced image is set as a center, respectively, and judges whether or not the subject is moved at the position of the pixel being the processing target based on a value of difference between the first average value and the second average value.

Further, it is also possible to include a storage section storing the position of the pixel being the processing target when the motion judgment section judges that the subject is moved at the position of the pixel being the processing target.

Further, it is also possible that the noise extraction section performs a weighted average processing on a pixel value of the pixel being the processing target of the first reduced image by using either one of pixel values in the target area of the first reduced image and pixel values in each target area of the first reduced image and the second reduced image based on a judgment result made by the motion judgment section, and extracts the noise component in the frequency band from a difference between the pixel value of the pixel being the processing target of the first reduced image and a weighted averaged pixel value.

Further, it is also possible that the noise extraction section performs a weighted average processing on a pixel value of the pixel being the processing target of the first reduced image in accordance with the value of the difference by using pixel values in each target area of the first reduced image and the second reduced image, and extracts the noise component in the frequency band from a difference between the pixel value of the pixel being the processing target of the first reduced image and a weighted averaged pixel value.

Further, it is also possible that the noise reduction section performs, by using the pixel values in each target area of the reference image and the target image from which the noise component in the frequency band is reduced, a weighted average processing on the pixel value of the pixel being the processing target of the target image from which the noise component in the frequency band is reduced, and reduces a noise component in a high frequency band in the pixel being the processing target of the target image.

Further, it is also possible that the weighted average processing is performed by using either one of a bilateral filter and an epsilon filter.

Further, it is also possible to include a compression processing section performing an image compression on the target image from which the noise component in the frequency band is reduced, and reducing a noise component in a high frequency band.

Further, it is also possible that the target image is one of continuously captured images, and the reference image is an image captured before the target image and applied the noise reduction out of the continuously captured images.

An image processing apparatus of the present application includes a first coefficient determination section determining a value of a first coefficient based on a difference between a target image being a noise reduction target and a reference image to be a reference of a noise reduction processing, a second coefficient determination section determining a value of a second coefficient based on brightness information of any one of the target image, the reference image, and both the target image and the reference image, and a noise reduction section reducing a noise superimposed on the target image by performing a weighted addition on the target image and the reference image by using the value of the first coefficient and the value of the second coefficient.

Further, it is also possible that the brightness information is either one of an average value of brightness values of the target image and the reference image, and a value obtained by performing a weighted addition on the brightness values of the target image and the reference image by using the value of the first coefficient.

Further, it is also possible that the first coefficient determination section determines the value of the first coefficient for each color component included in the target image.

Further, it is also possible that the first coefficient determination section determines the value of the first coefficient for each brightness component and color difference component included in the target image.

An image processing apparatus of the present application includes a reduced image generation section generating a pair of a first reduced image obtained by reducing a target image being a noise reduction target and a second reduced image obtained by reducing a reference image to be a reference of a noise reduction processing at a same reduction ratio as a reduction ratio of the first reduced image, at least one reduction ratio, a first coefficient determination section determining a value of a first coefficient based on a difference between the first reduced image and the second reduced image, a second coefficient determination section determining a value of a second coefficient based on a brightness level of any one of the first reduced image, the second reduced image, and both the first reduced image and the second reduced image, and a noise reduction section performing a weighted addition on the first reduced image and the second reduced image by using the value of the first coefficient and the value of the second coefficient, extracting a noise in a frequency band corresponding to the reduction ratio, and reducing the noise in the frequency band from a pixel value of the target image.

Further, it is also possible that, when a plurality of pairs of the first reduced image and the second reduced image are generated at a plurality of reduction ratios, the noise reduction section sequentially extracts the noise in the frequency band from a pair whose reduction ratio corresponds to a minimum reduction ratio.

Further, it is also possible that the first coefficient determination section determines a value of a third coefficient based on a difference between the reference image and the target image from which the noise in the frequency band is reduced, the second coefficient determination section determines a value of a fourth coefficient based on brightness information of any one of the reference image, the target image, and both the reference image and the target image from which the noise in the frequency band is reduced, and the noise reduction section performs a weighted addition on the reference image and the target image from which the noise in the frequency band is reduced by using the value of the third coefficient and the value of the fourth coefficient, and reduces a noise in a high frequency band superimposed on the target image.

Further, it is also possible to include a compression processing section performing an image compression on the target image from which the noise in the frequency band is reduced, and reducing a noise in a high frequency band superimposed on the target image.

Further, it is also possible that the target image is one of continuously captured images, and the reference image is an image captured before the target image and applied the noise reduction out of the continuously captured images.

An imaging apparatus of the present application includes: an imaging section generating an image by capturing a subject image, and the image processing apparatus of the present application.

A non-transitory computer readable medium storing an image processing program of the present application makes a computer execute an input step reading a target image being a noise reduction target and a reference image to be a reference of a noise reduction processing, a reduced image generation step generating a first reduced image obtained by reducing at least the target image, a noise extraction step extracting a noise component in a frequency band corresponding to a reduction ratio of the first reduced image by using at least the first reduced image, and a noise reduction step reducing the noise component in the frequency band from a pixel value of each pixel of the target image based on the noise component in the frequency band being extracted.

A non-transitory computer readable medium storing an image processing program of the present application makes a computer execute an input step reading a target image being a noise reduction target and a reference image to be a reference of a noise reduction processing, a reduced image generation step generating a pair of a first reduced image obtained by reducing the target image and a second reduced image obtained by reducing the reference image at a same reduction ratio as a reduction ratio of the first reduced image, at least one reduction ratio, a noise extraction step extracting a noise component in a frequency band corresponding to the reduction ratio by using the first reduced image and the second reduced image, and a noise reduction step reducing the noise component in the frequency band from a pixel value of each pixel of the target image based on the noise component in the frequency band being extracted.

A non-transitory computer readable medium storing an image processing program of the present application makes a computer execute an input step reading a target image being a noise reduction target and a reference image to be a reference of a noise reduction processing, a reduced image generation step generating a pair of a first reduced image obtained by reducing the target image and a second reduced image obtained by reducing the reference image at a same reduction ratio as a reduction ratio of the first reduced image, at least one reduction ratio, a motion judgment step judging whether or not a subject of the target image is moved, based on a comparison between the first reduced image and the second reduced image, a noise extraction step extracting a noise component in a frequency band corresponding to the reduction ratio from the first reduced image and the second reduced image based on a judgment result achieved in the motion judgment step, and a noise reduction step reducing the noise component in the frequency band from the target image.

A non-transitory computer readable medium storing an image processing program of the present application makes a computer execute an input step reading a target image being a noise reduction target and a reference image to be a reference of a noise reduction processing, a first coefficient determination step determining a value of a first coefficient based on a difference between the target image and the reference image, a second coefficient determination step determining a value of a second coefficient based on brightness information of any one of the target image, the reference image, and both the target image and the reference image, and a noise reduction step reducing a noise superimposed on the target image by performing a weighted addition on the target image and the reference image by using the value of the first coefficient and the value of the second coefficient.

A non-transitory computer readable medium storing an image processing program of the present application makes a computer execute an input step reading a target image being a noise reduction target and a reference image to be a reference of a noise reduction processing, a reduced image generation step generating a pair of a first reduced image obtained by reducing the target image and a second reduced image obtained by reducing the reference image at a same reduction ratio as a reduction ratio of the first reduced image, at least one reduction ratio, a first coefficient determination step determining a value of a first coefficient based on a difference between the first reduced image and the second reduced image, a second coefficient determination step determining a value of a second coefficient based on brightness information of any one of the first reduced image, the second reduced image, and both the first reduced image and the second reduced image, and a noise reduction step performing a weighted addition on the first reduced image and the second reduced image by using the value of the first coefficient and the value of the second coefficient, extracting a noise in a frequency band corresponding to the reduction ratio, and reducing the noise in the frequency band from the target image.

DETAILED DESCRIPTION OF THE EMBODIMENTS

First Embodiment

Figure 1:
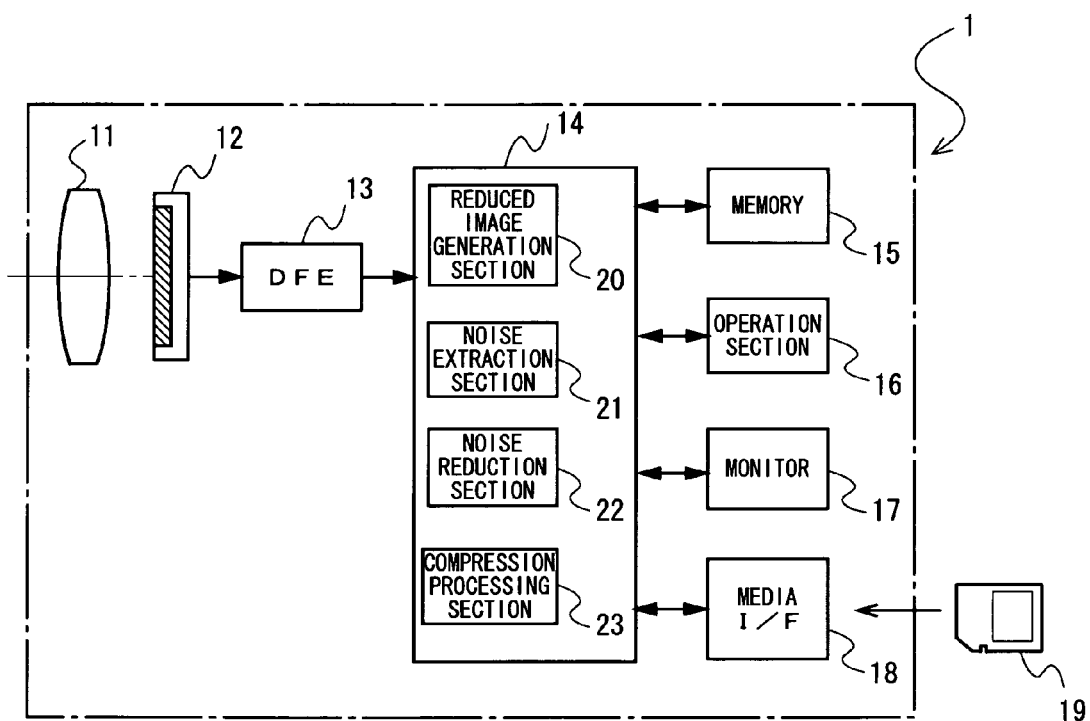
FIG. 1 is a block diagram illustrating an example of a configuration of a digital camera 1 according to a first embodiment.

FIG. 1 is a block diagram illustrating an example of a configuration of a digital camera 1 according to a first embodiment.

The digital camera 1 of the present embodiment includes an imaging optical system 11, an image sensor 12, a DFE 13, a CPU 14, a memory 15, an operation section 16, a monitor 17 and a media I/F 18. Here, the DFE 13, the memory 15, the operation section 16, the monitor 17 and the media I/F 18 are respectively connected to the CPU 14.

The image sensor 12 is a device capturing a subject image formed by a luminous flux that passes through the imaging optical system 11. An output of the image sensor 12 is connected to the DFE 13. Note that the image sensor 12 of the present embodiment may also be a progressive scanning type solid-state image sensor (CCD or the like) or an XY address type solid-state image sensor (CMOS or the like).

On a light-receiving surface of the image sensor 12, a plurality of light-receiving elements are arranged in a matrix form. On each of the light-receiving elements of the image sensor 12, color filters of red color (R), green color (G) and blue color (B) are arranged in accordance with a well-known Bayer pattern. For this reason, the respective light-receiving elements of the image sensor 12 output image signals corresponding to respective colors, through color separation in the color filters. Accordingly, the image sensor 12 can obtain a color image at a time of capturing the image.

The DFE 13 is a digital front-end circuit that performs A/D conversion of an image signal input from the image sensor 12, and signal processing such as defective pixel correction. The DFE 13 forms an imaging section together with the image sensor 12 in the present embodiment, and outputs the image signal input from the image sensor 12 to the CPU 14 as image data.

The CPU 14 is a processor that comprehensively controls respective parts of the digital camera 1. For instance, the CPU 14 executes each of auto-focus (AF) control using well-known contrast detection, well-known automatic exposure (AE) calculation and the like, based on an output of the image sensor 12. Further, the CPU 14 performs digital processing on image data from the DFE 13. As an example, the digital processing includes interpolation processing, white balance processing, gradation conversion processing, edge enhancement processing, color conversion processing and the like. Further, when an image processing program is executed, the CPU 14 of the present embodiment operates as a reduced image generation section 20, a noise extraction section 21, a noise reduction section 22 and a compression processing section 23.

The reduced image generation section 20 generates, by using a well-known method, a reduced image of each frame of a moving image captured by the image sensor 12. The reduced image generation section 20 of the present embodiment generates two reduced images of one frame (target image) at reduction ratios of 1/4 and 1/16 (first reduced images). Further, the reduced image generation section 20 also generates reduced images of a reference image to be a reference of noise reduction processing at reduction ratios of 1/4 and 1/16 (second reduced images). Note that the reference image in the present embodiment is set to a frame which is one frame before the target image in the moving image, and an image to which noise reduction is applied. Further, the well-known method in the present embodiment is set to, for example, multiresolution analysis and Nearest Neighbor method.

The noise extraction section 21 uses the reduced images of the target image and the reference image reduced at the same reduction ratio, as one pair, and extracts a noise component superimposed on the target image. From each of the reduced images, a noise component in a frequency band corresponding to the reduction ratio is extracted. Concretely, the noise extraction section 21 uses one pair of the reduced images generated from the target image and the reference image, and performs weighted average processing on a pixel value $d_i$ of each pixel i of the reduced image of the target image. The weighted average processing performed by the noise extraction section 21 is conducted using a bilateral filter in which a variation in a time direction is also taken into consideration, as represented by an equation (1), for example.

$$d'_i = \frac{\sum_{j \in Sa+Sb} w_j \cdot d_j}{\sum_{j \in Sa+Sb} w_j} \quad (1)$$

Here, $d'_i$ and $d_j$ indicate a pixel value, to which the weighted average is applied, of the pixel i of the reduced image of the target image, and a pixel value of pixel j of the reduced images of the target image and the reference image, respectively. Further, Sa and Sb indicate an aggregation of pixels of the reduced image of the target image and that of the reference image, respectively, and satisfy relations of the pixel i∈Sa, and the pixel j∈Sa+Sb.

Meanwhile, w in the equation (1) indicates a weighting coefficient, and is represented by a product of weighting coefficients of a spatial component wx, a pixel value component wd and a time component wt of a Gaussian function, as represented by the following equation (2).

$$w_j = wx_j \cdot wd_j \cdot wt_j \quad (2)$$
$$= \exp\left(-\frac{|x_i - x_j|^2}{2\sigma_1^2}\right) \cdot \exp\left(-\frac{|d_i - d_j|^2}{2\sigma_2^2}\right) \cdot \exp\left(-\frac{|t_i - t_j|^2}{2\sigma_3^2}\right)$$

Here, x indicates space coordinates of pixels of the reduced images of the target image and the reference image and formed of components in a horizontal scanning direction and in a vertical scanning direction. t indicates time coordinates of the reduced images of the target image and the reference image. Note that it is set that the time coordinate t in the present embodiment indicates a frame number. Further, it is preferable that values of $\sigma_1$, $\sigma_2$, $\sigma_3$ of respective components are appropriately selected to be set in accordance with a required accuracy of noise reduction processing and the like.

The noise extraction section 21 performs the weighted average processing using the bilateral filter described above, thereby calculating a reduced image of the target image having the pixel value $d'_i$. The reduced image of the target image having the pixel value $d'_i$ is an image as a result of reducing the noise component in the frequency band corresponding to the reduction ratio. The noise extraction section 21 calculates a difference between the pixel value $d_i$ of the target image to which the weighted average is not yet applied and the pixel value $d'_i$ as a result of applying the weighted average, to thereby extract a noise component $N_i$ in the frequency band corresponding to the reduction ratio. The noise extraction section 21 outputs the extracted noise component $N_i$ in the frequency band as noise data.

The noise reduction section 22 uses the extracted noise data in the plurality of frequency bands to reduce a noise superimposed on the target image. Here, the noise component $N_i$ of the noise data in each frequency band corresponds to each pixel of the reduced image of the target image reduced at the reduction ratio corresponding to the frequency band. The noise reduction section 22 converts the noise data in each frequency band into noise data in each pixel of the original target image. The noise reduction section 22 subtracts the converted noise data from the original target image, thereby reducing the noise component in each frequency band. Further, the noise reduction section 22 of the present embodiment performs, after reducing all of the noise components in the frequency bands described above, weighted average processing on the pixel value of each pixel of the target image through the bilateral filter in the equation (1) and the equation (2), by using the target image and the reference image. The noise reduction section 22 reduces a noise component in a high frequency band superimposed on the target image itself.

Note that on each of the reduced images, not only the noise component in the frequency band corresponding to its own reduction ratio but also a noise component in a low frequency band included in a smaller reduced image is superimposed. Accordingly, the noise reduction section 22 in the present embodiment converts the noise data extracted by the noise extraction section 21 into not only the noise data in each pixel of the original target image but also noise data in each pixel of a reduced image whose reduction ratio is larger than that of the reduced image. The noise reduction section 22 reduces, by using the converted noise data, a noise component in a lower frequency band superimposed on each of the reduced images. Accordingly, the noise extraction section 21 can highly accurately extract, from each of the reduced images, the noise component in the frequency band corresponding to the reduction ratio of each of the reduced images.

The compression processing section 23 performs, in accordance with a moving image format such as H.264 and Motion JPEG, moving image compression on the target image as a result of reducing the noise components in the respective frequency bands, thereby generating moving image data.

The memory 15 is a nonvolatile flash memory storing respective programs such as the image processing program executed by the CPU 14, together with image data and the like.

The operation section 16 receives, from a user, an input of switching setting of an imaging mode, an instruction to capture a still image, perform continuous shooting or capture a moving image, and the like, for example.

The monitor 17 is a monitor such as a liquid crystal monitor, and displays respective images in accordance with a control instruction made by the CPU 14. For instance, after capturing a moving image, the monitor 17 reproduces and displays the captured moving image in accordance with a control instruction made by the CPU 14.

To the media I/F 18, the nonvolatile storage medium 19 can be detachably connected. Further, the media I/F 18 executes writing/reading of data into/from the storage medium 19. The above-described storage medium 19 is formed of a hard disk, a memory card having a semiconductor memory built therein or the like. Note that in FIG. 1, a memory card is illustrated as an example of the storage medium 19.

Figure 2:
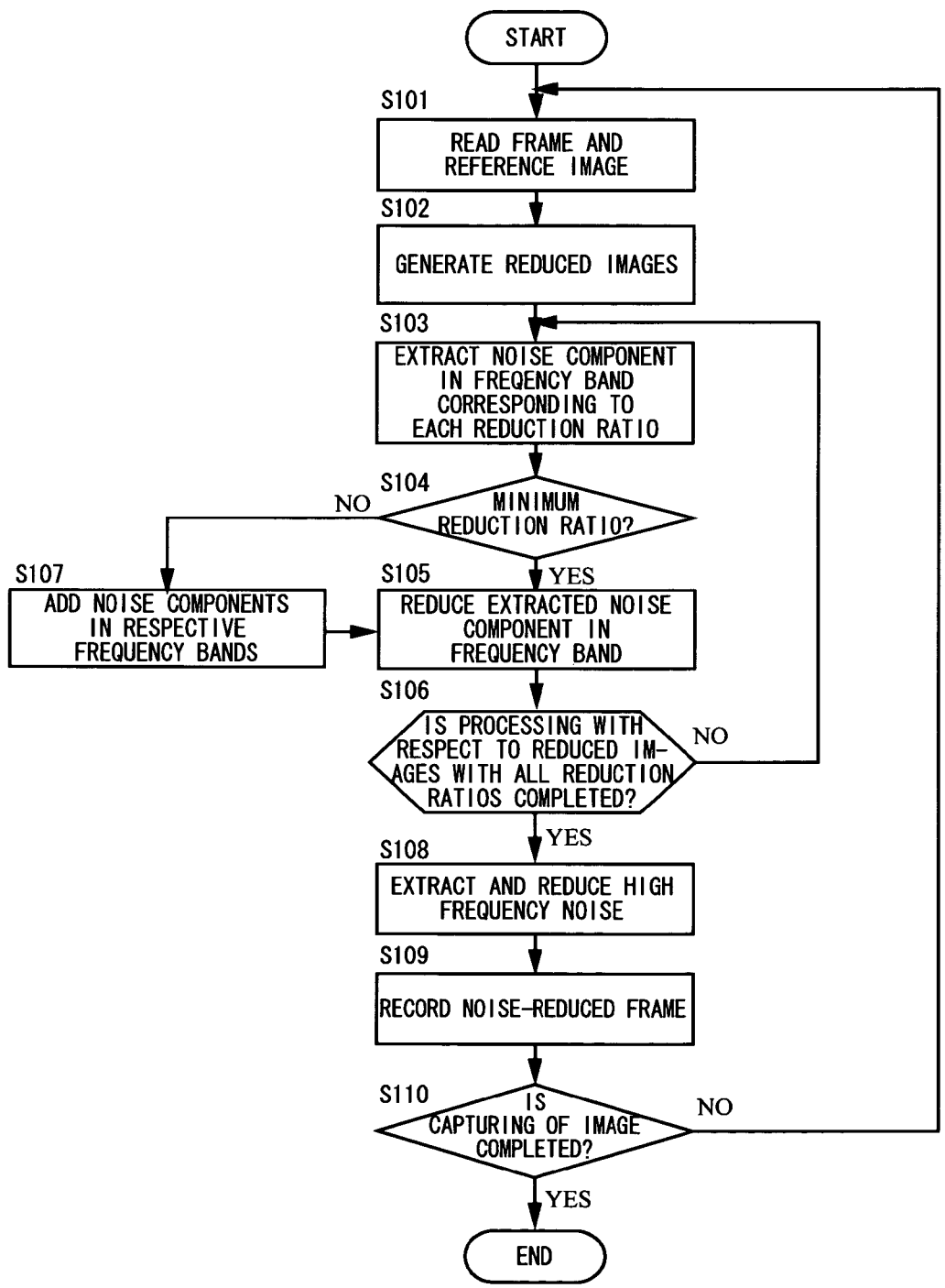
FIG. 2 is a flow chart illustrating an example of noise reduction processing performed by the digital camera 1 according to the first embodiment.
Figure 3:
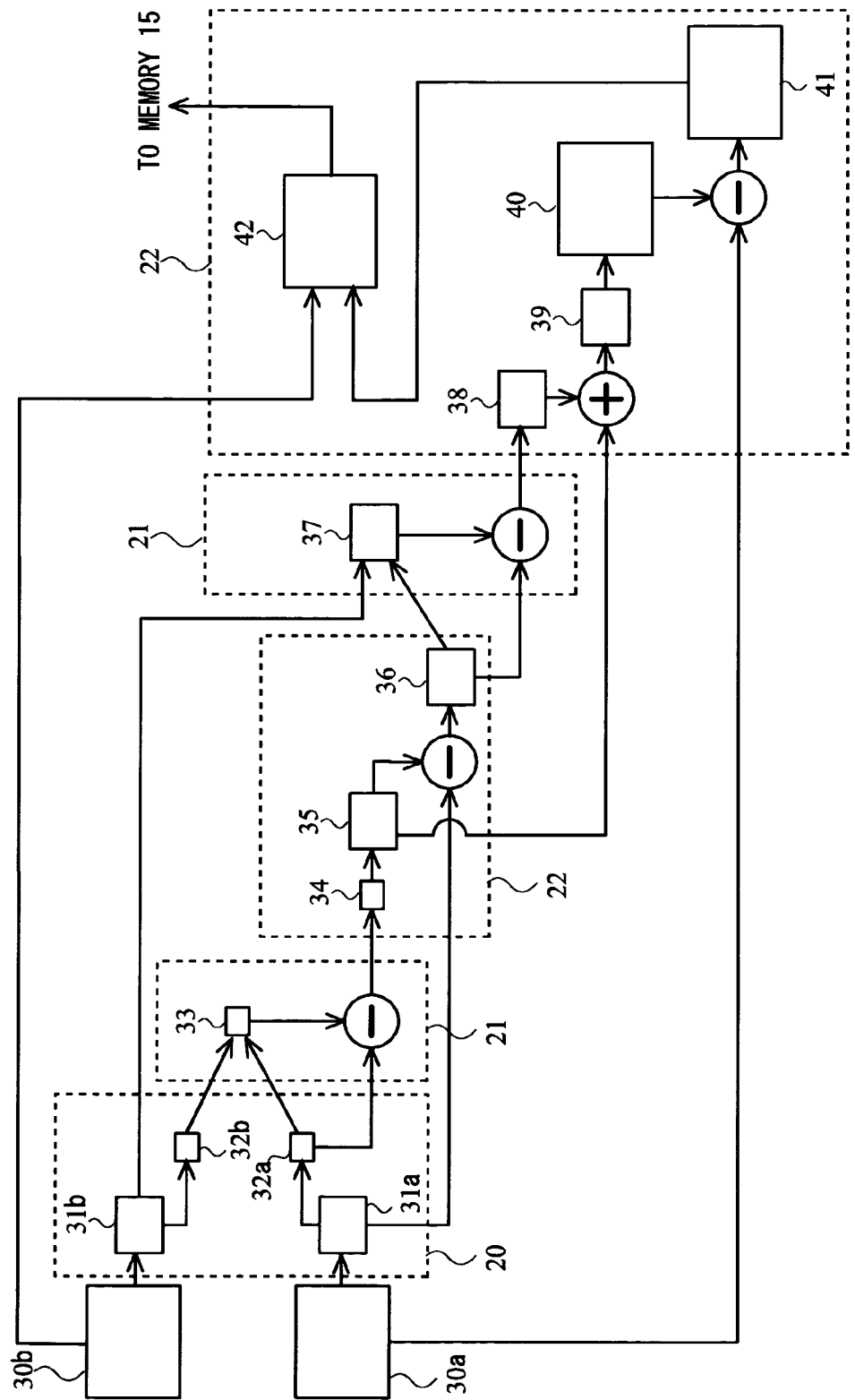
FIG. 3 is a diagram illustrating an example of a flow of image data in the noise reduction processing illustrated in FIG. 2.

Next, a processing operation performed by the digital camera 1 according to the present embodiment will be explained, while referring to a flow chart in FIG. 2 and a flow chart of image data in FIG. 3.

Note that as described above, on the reduced image, not only the noise component in the frequency band corresponding to its own reduction ratio but also the noise component in the lower frequency band included in the smaller reduced image is superimposed. Conversely, the reduced image does not include a noise component in a high frequency band included in an image whose image size is larger than that of the reduced image. Accordingly, in the following explanation, it is set that processing in the present embodiment is started to be performed on the reduced image with the minimum reduction ratio first, so that the noise extraction section 21 can efficiently extract, from each of the reduced images, the noise component in the frequency band corresponding to the reduction ratio of each of the reduced images.

Upon receiving an instruction to capture a moving image from a user (a full depression operation of release button included in the operation section 16 or the like, for instance), the CPU 14 makes the image sensor 12 start capturing a moving image of a subject. The CPU 14 starts processing from step S101.

Step S101: The CPU 14 reads, via the DFE 13 a first frame output from the image sensor 12 as a target image 30a. At the same time, the CPU 14 sets the target image 30a as a reference image 30b of noise reduction processing. Note that the reference image 30b with respect to the target image 30a of a second frame or thereafter is set to a frame which is one frame before the target image and to which the noise reduction of the present embodiment is applied.

Step S102: The reduced image generation section 20 of the CPU 14 generates reduced images of each of the read target image 30a and reference image 30b at reduction ratios of 1/4 and 1/16. In FIG. 3, the reduced images of the frame 30a with the reduction ratios of 1/4 and 1/16 (first reduced images) are denoted by reference numerals and letters 31a and 32a, and the reduced images of the reference image 30b with the reduction ratios of 1/4 and 1/16 (second reduced images) are denoted by reference numerals and letters 31b and 32b.

Step S103: The noise extraction section 21 of the CPU 14 reads the reduced images 32a, 32b of the target image 30a and the reference image 30b with the reduction ratio of 1/16. The noise extraction section 21 performs, by using one pair of the reduced images 32a, 32b, weighted average processing with the use of the bilateral filter in the equation (1) and the equation (2). The noise extraction section 21 calculates a reduced image 33 of the target image 30a at a reduction ratio of 1/16. Note that the reduced image 33 is an image as a result of reducing a noise component in a frequency band corresponding to the reduction ratio of 1/16 (referred to as a low frequency band, hereinafter). The noise extraction section 21 subtracts a pixel value $d'_i$ of pixel i of the reduced image 33 from a pixel value $d_i$ of pixel i of the reduced image 32a, thereby extracting noise data 34 in the low frequency band in each pixel i of the reduced image 32a.

Step S104: The CPU 14 judges whether or not the noise data extracted in step S103 is one extracted from the reduced image with the minimum reduction ratio. When it is judged that the noise data is the one extracted from the reduced image with the minimum reduction ratio, the CPU 14 proceeds to step S105 (YES side). Meanwhile, when it is judged that the noise data is not the one extracted from the reduced image with the minimum reduction ratio, the CPU 14 proceeds to step S107 (NO side).

Step S105: The noise reduction section 22 of the CPU 14 converts the extracted noise data 34 into noise data 35 in the low frequency band in each pixel of the reduced image 31a with the reduction ratio of 1/4. The noise reduction section 22 subtracts a noise component of the noise data 35 from a pixel value of each pixel of the reduced image 31a, thereby calculating a reduced image 36 as a result of reducing the noise component in the low frequency band superimposed on the reduced image 31a. Note that the reduced image 36 includes a noise component in a frequency band corresponding to the reduction ratio of 1/4 (referred to as a middle frequency band, hereinafter).

Step S106: The CPU 14 judges whether or not the processing with respect to the reduced images with all of the reduction ratios is completed. When the CPU 14 judges that the processing with respect to the reduced images with all of the reduction ratios is completed, it proceeds to step S108 (YES side).

Meanwhile, when the CPU 14 judges that the processing with respect to the reduced images with all of the reduction ratios is not completed, it proceeds to step S103 (NO side). In step S103 at a second time, the noise extraction section 21 performs, by using the reduced image 36 with the reduction ratio of 1/4 as a result of reducing the noise component in the low frequency band and the reduced image 31b of the reference image 30b with the reduction ratio of 1/4, weighted average processing with the use of the bilateral filter in the equation (1) and the equation (2). The noise extraction section 21 calculates a reduced image 37 with a reduction ratio of 1/4 as a result of reducing the noise component in the middle frequency band. The noise extraction section 21 subtracts a pixel value $d'_i$ of pixel i of the reduced image 37 from a pixel value $d_i$ of pixel i of the reduced image 36, thereby extracting noise data 38 of the noise component in the middle frequency band in each pixel of the reduced image 31a. The CPU 14 proceeds to step S107 (NO side) in step S104.

Step S107: The noise reduction section 22 adds, in each pixel, the noise components of the noise data 35 in the low frequency band and the noise data 38 in the middle frequency band, thereby generating noise data 39 in the low and middle frequency bands.

The noise reduction section 22 converts, in step S105, the noise data 39 in the low and middle frequency bands into noise data 40 in the low and middle frequency bands in each pixel of the original target image 30a. The noise reduction section 22 subtracts a noise component of the noise data 40 from a pixel value of each pixel of the original target image 30a, thereby generating a target image 41 as a result of reducing the noise components in the low and middle frequency bands superimposed on the target image 30a. The CPU 14 proceeds to step S108 in step S106.

Step S108: The noise reduction section 22 performs, by using the target image 41 as a result of reducing the noise in the low and middle frequency bands and the reference image 30b, weighted average processing with the use of the bilateral filter in the equation (1) and the equation (2). The noise reduction section 22 generates a target image 42 as a result of reducing a noise component in a high frequency band.

Step S109: The compression processing section 23 of the CPU 14 performs, in accordance with a moving image format such as H.264 and Motion JPEG, moving image compression on the target image 42 as a result of reducing the noise components in the frequency bands ranging from the low frequency band to the high frequency band, thereby generating moving image data. The CPU 14 temporarily records the moving image data in the memory 15. At the same time, the CPU 14 records the target image 42 in the memory 15 to set it as the reference image 30b with respect to the target image 30a of the next frame.

Step S110: The CPU 14 judges whether or not it receives an instruction to terminate the capturing of moving image, based on a release of the full depression of release button of the operation section 16 made by the user, for example. When the CPU 14 judges that it receives the instruction to terminate the capturing of moving image (YES side), it generates a moving image file from the moving image data temporarily recorded in the memory 15, and records the file in the memory 15 or the storage medium 19. The CPU 14 terminates the series of processing. Meanwhile, when the CPU 14 judges that it does not receive the instruction to terminate the capturing of moving image, it proceeds to step S101 (NO side). The CPU 14 performs the processing from step S101 to step S109 with respect to the target image 30a of the second frame or thereafter, until it receives the instruction of termination.

As described above, in the present embodiment, the plurality of reduced images with different reduction ratios are generated, and the noise components are obtained sequentially from the noise component in the frequency band corresponding to the minimum reduction ratio, so that even when the noise intensity is high, the noise reduction can be performed with high accuracy.

Further, since the weighting coefficient w in the bilateral filter is set to the product of weighting coefficients of respective components represented by the Gaussian function, when, for example, a variation in pixel values in accordance with a motion of the subject is large or the noise intensity is high, the value of pixel value component wd becomes very small, resulting in that the weighting coefficient w becomes very small as well. Accordingly, in the noise reduction processing of the present embodiment, it is possible to suppress influences of the variation in the pixel values in accordance with the motion of the subject or the noise intensity, which enables to highly accurately perform the noise reduction on the moving image.

Second Embodiment

A digital camera according to a second embodiment of the present application has the same configuration as that of the digital camera 1 according to the first embodiment in FIG. 1, so that detailed explanation of respective components will be omitted.

Figure 4:
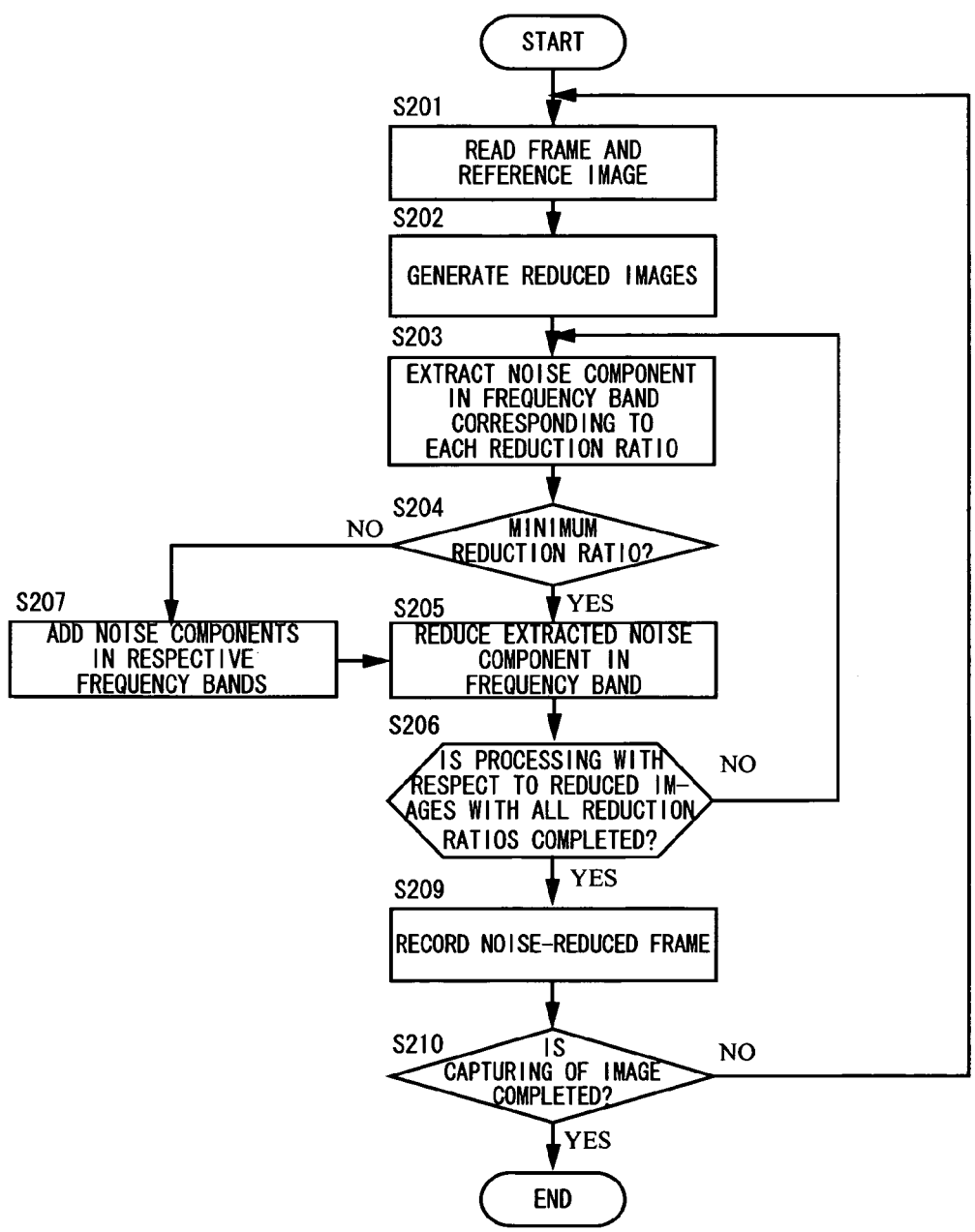
FIG. 4 is a flow chart illustrating an example of noise reduction processing performed by a digital camera 1 according to a second embodiment.

FIG. 4 illustrates a flow chart of a processing operation performed by a digital camera 1 of the present embodiment. In FIG. 4, processing similar to that of the first embodiment illustrated in FIG. 2 is denoted by a step number whose last two digits are the same as those of the step number of the processing in the first embodiment, and detailed explanation thereof will be omitted.

Figure 5:
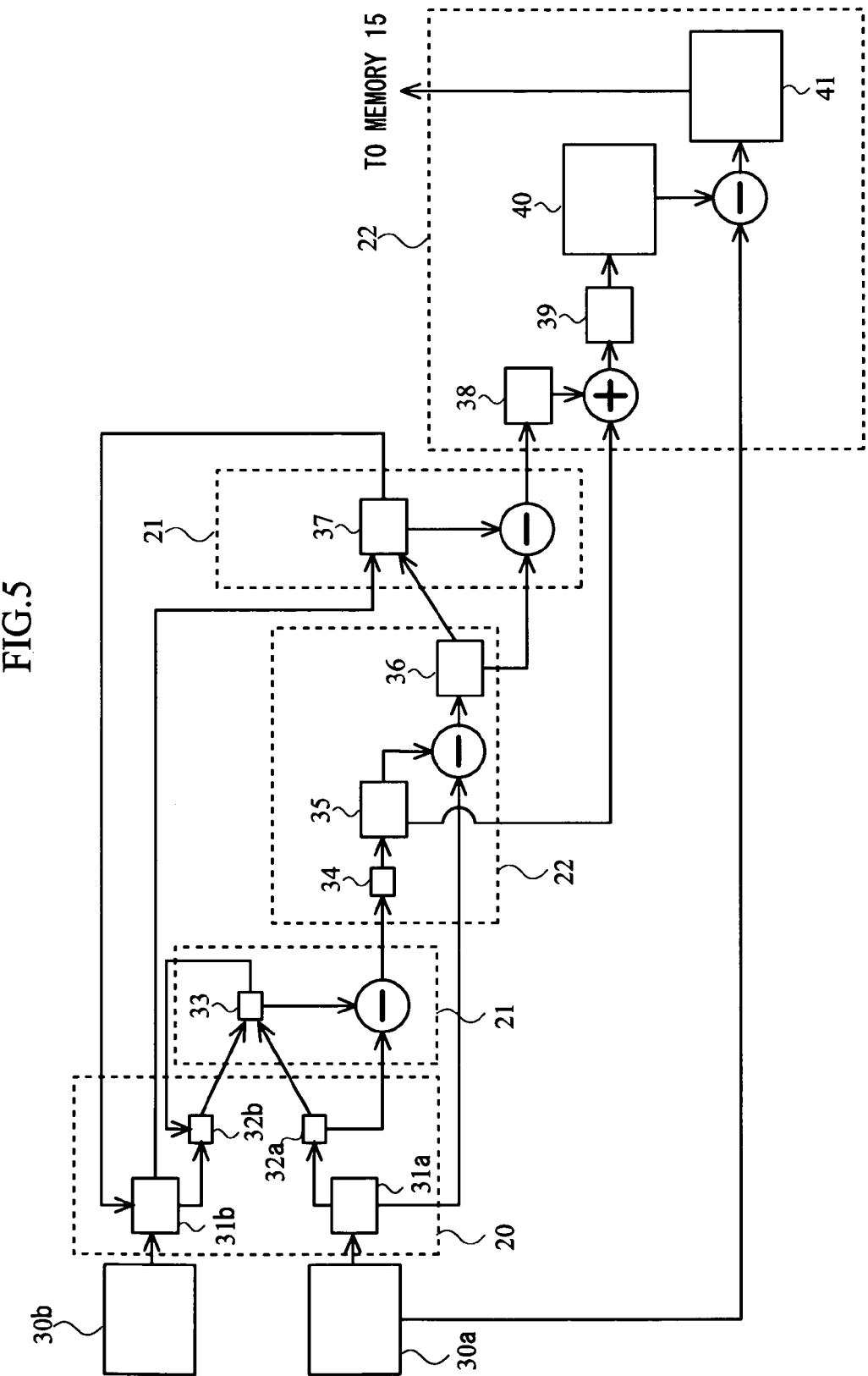
FIG. 5 is a diagram illustrating an example of a flow of image data in the noise reduction processing illustrated in FIG. 4.

FIG. 5 illustrates a flow of image data in the processing illustrated in FIG. 4. In FIG. 5, image data which are the same as the image data in the first embodiment illustrated in FIG. 3 are denoted by the same reference numerals and letters, and detailed explanation thereof will be omitted.

A point in which the processing operation performed by the digital camera 1 according to the present embodiment differs from the processing operation according to the first embodiment is that the noise reduction processing in the high frequency band in step S108 is omitted. This is because moving image compression processing for converting the target image 41 into moving image data performed by the compression processing section 23 in step S209 (which corresponds to step S109) has an effect similar to that of reducing the noise component in the high frequency band.

Further, since the processing in step S108 is omitted, the target image 42 is not calculated. Accordingly, the reduced image generation section 20 does not generate, in step S202, the reduced images 31b, 32b of the reference image 30b of the second frame or thereafter. Further, in step S209, the CPU 14 records the reduced images 33, 37 in the memory 15 to set them as the reduced images 32b and 31b of the reference image 30b with the reduction ratios of 1/16 and 1/4. The noise extraction section 21 reads, in step S203, the reduced images 31b, 32b from the memory 15.

As described above, in the present embodiment, the plurality of reduced images with different reduction ratios are generated, and the noise components are obtained sequentially from the noise component in the frequency band corresponding to the minimum reduction ratio, so that even when the noise intensity is high, the noise reduction can be performed with high accuracy.

Further, since the weighting coefficient w in the bilateral filter is set to the product of weighting coefficients of respective components represented by the Gaussian function, when, for example, a variation in pixel values in accordance with a motion of the subject is large or the noise intensity is high, the value of pixel value component wd becomes very small, resulting in that the weighting coefficient w becomes very small as well. Accordingly, in the noise reduction processing of the present embodiment, it is possible to suppress influences of the variation in the pixel values in accordance with the motion of the subject or the noise intensity, which enables to highly accurately perform the noise reduction on the moving image.

Further, by performing the moving image compression processing in substitution for the noise reduction in the high frequency band, it is possible to realize the reduction in the processing time of the noise reduction processing performed by the digital camera 1 and the reduction in the processing load, resulting in that a circuit scale of the digital camera 1 can be reduced.

Further, by omitting the generation processing of the reduced images of the reference image 30b of the second frame or thereafter performed by the reduced image generation section 20, it is possible to realize further reduction in the processing time of the noise reduction processing and further reduction in the processing load, which enables to further reduce the circuit scale of the digital camera 1.

Third Embodiment

Figure 6:
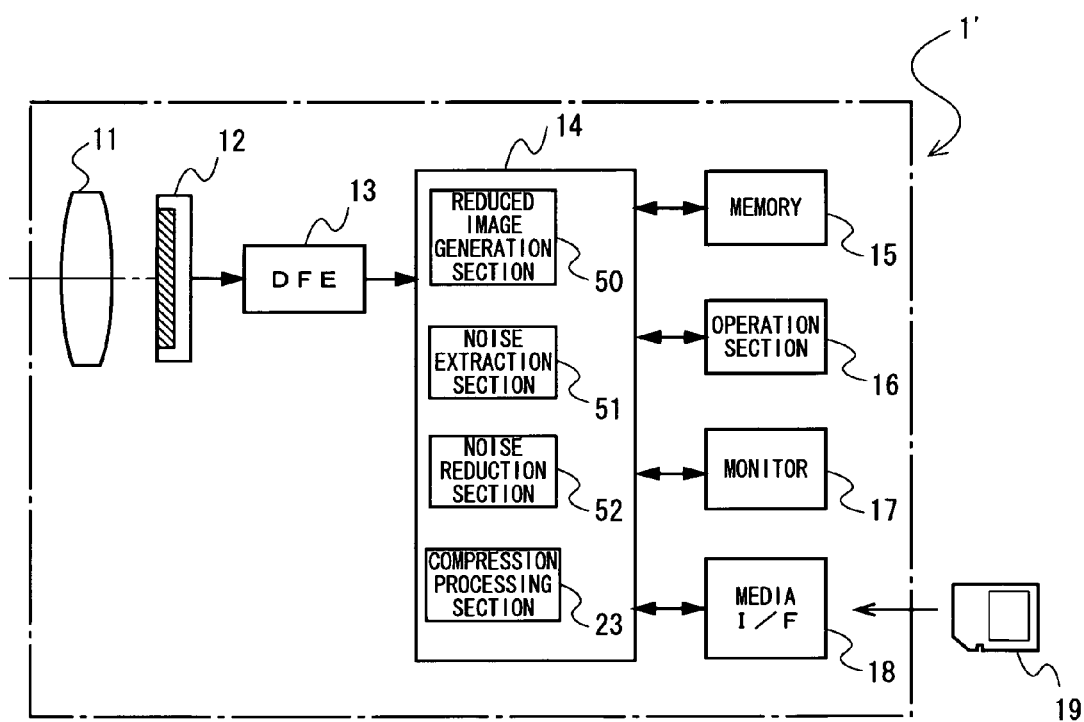
FIG. 6 is a block diagram illustrating an example of a configuration of a digital camera 1' according to a third embodiment.

FIG. 6 is a block diagram illustrating an example of a configuration of a digital camera 1' according to a third embodiment.

In the digital camera 1' according to the present embodiment, a component which operates in the same manner as the component of the digital camera 1 according to the first embodiment illustrated in FIG. 1 is denoted by the same reference numeral, and detailed explanation thereof will be omitted.

A reduced image generation section 50 generates a reduced image of each frame of a moving image captured by the image sensor 12. The reduced image generation section 50 generates a reduced image of each frame (target image) at one reduction ratio of 1/4 (first reduced image). Note that the reduced image generation section 50 of the present embodiment does not generate a reduced image of a reference image to be a reference of noise reduction processing. Further, the reduced image generation section 50 may also generate a plurality of reduced images of the target image at a plurality of reduction ratios.

A noise extraction section 51 applies a bilateral filter represented, not by the equation (1) but by the following equation (3), for example, to the reduced image of the target image, thereby performing weighted average processing on a pixel value $d_i$ of each pixel i.

$$d'_i = \frac{\sum_{j \in Sa} w_j \cdot d_j}{\sum_{j \in Sa} w_j} \qquad (3)$$

Note that w in the equation (3) is a weighting coefficient and is a product of weighting coefficients of the spatial component wx, the pixel value component wd and the time component wt represented by the equation (2). Note that in this case, since $t_i$ is equal to the time component wt takes 1. Specifically, in the weighted average processing in the equation (3), only a variation in a spatial direction (noise component) is reduced.

The noise extraction section 51 calculates a reduced image of the target image having a pixel value $d'_i$ as a result of reducing a noise component in a frequency band corresponding to the reduction ratio. The noise extraction section 51 calculates a difference between the pixel value $d_i$ of the target image to which the weighted average is not yet applied and the pixel value $d'_i$ as a result of applying the weighted average, to thereby extract a noise component $N_i$ in the frequency band corresponding to the reduction ratio. The noise extraction section 51 outputs the extracted noise component $N_i$ in the frequency band as noise data.

A noise reduction section 52 uses the extracted noise data in the frequency band to reduce a noise superimposed on the target image. The noise reduction section 52 performs, after reducing noise components in frequency bands corresponding to all of reduction ratios, the weighted average processing using the equation (3) again on the target image to reduce a noise in a high frequency band superimposed on the target image itself.

Further, the noise reduction section 52 of the present embodiment performs, by using the aforementioned target image as a result of reducing the noise component in the high frequency band and the reference image, weighted average processing on a pixel value of each pixel i of the target image through a bilateral filter represented by the following equation (4), for example. The noise reduction section 52 reduces a variation component in a time direction superimposed on the target image.

$$d'_i = \frac{\sum_{j \in Sb} w_j \cdot d_j}{\sum_{j \in Sb} w_j} \quad (4)$$

Note that w in the equation (4) is a weighting coefficient and is a product of weighting coefficients of the spatial component wx, the pixel value component wd and the time component wt represented by the equation (2), similar to a case of the equation (3).

Figure 7:
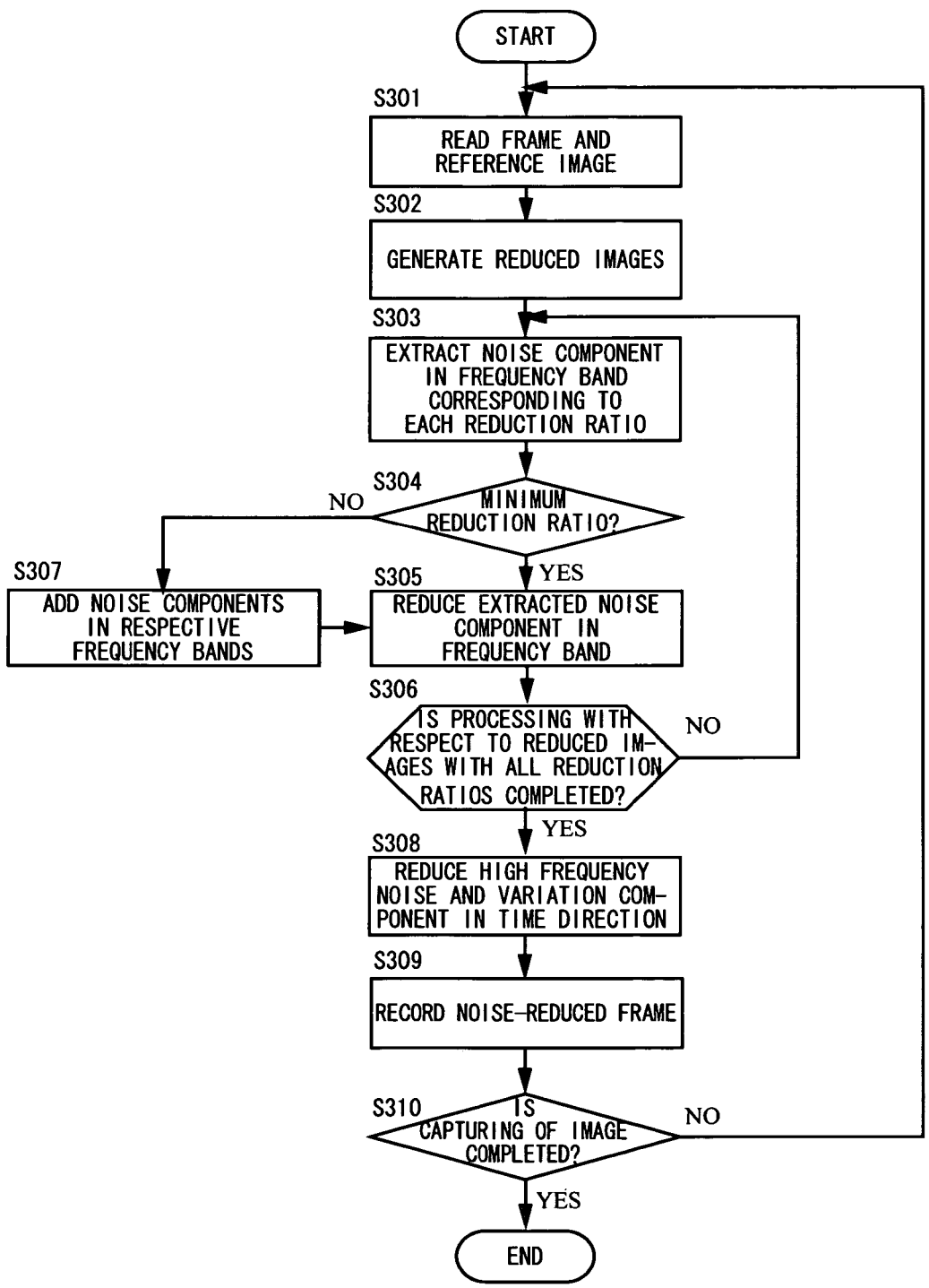
FIG. 7 is a flow chart illustrating an example of noise reduction processing performed by the digital camera 1' according to the third embodiment.
Figure 8:
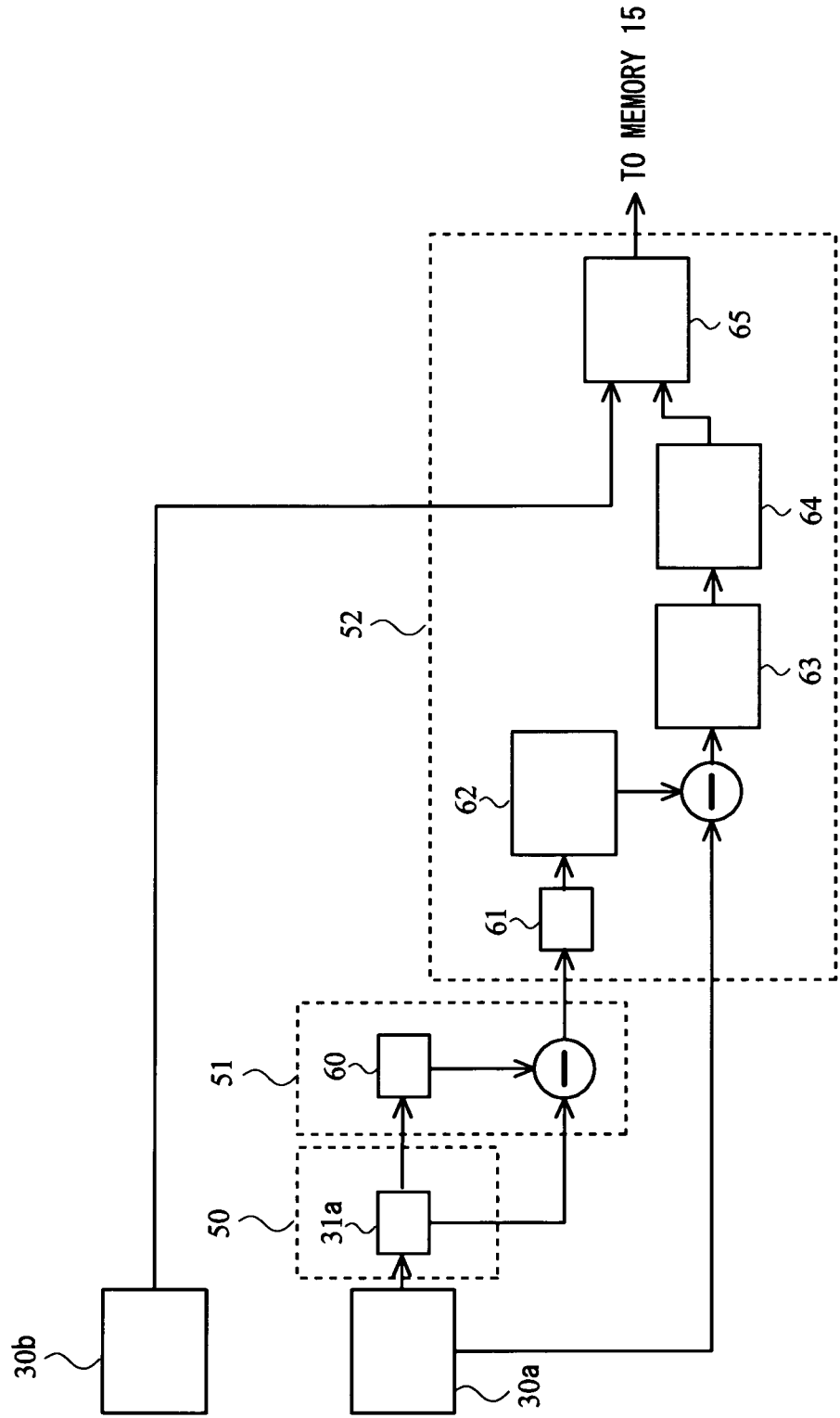
FIG. 8 is a diagram illustrating an example of a flow of image data in the noise reduction processing illustrated in FIG. 7.

Next, a processing operation performed by the digital camera 1' according to the present embodiment will be explained, while referring to a flow chart in FIG. 7 and a flow chart of image data in FIG. 8. Note that in FIG. 8, image data which are the same as the image data in the first embodiment illustrated in FIG. 3 are denoted by the same reference numerals and letters, and detailed explanation thereof will be omitted.

Further, in the present embodiment, although the reduced image generation section 50 generates only the reduced image with the reduction ratio of 1/4, when a plurality of reduced images are generated at a plurality of reduction ratios, the noise extraction section 51 starts performing the extraction processing on the reduced image with the minimum reduction ratio first, so that it can efficiently extract, from each of the reduced images, the noise component in the frequency band corresponding to the reduction ratio of each of the reduced images, similar to a case of the first embodiment.

Upon receiving an instruction to capture a moving image from a user (a full depression operation of release button included in the operation section 16 or the like, for instance), the CPU 14 makes the image sensor 12 start capturing a moving image of a subject. The CPU 14 starts processing from step S301.

Step S301: The CPU 14 reads, via the DFE 13, a first frame output from the image sensor 12 as a target image 30a. At the same time, the CPU 14 sets the target image 30a as a reference image 30b of noise reduction processing. Note that the reference image 30b with respect to the target image 30a of a second frame or thereafter is set to a frame which is one frame before the target image and to which the noise reduction of the present embodiment is applied.

Step S302: The reduced image generation section 50 of the CPU 14 generates a reduced image 31a of the read target image 30a at a reduction ratio of 1/4.

Step S303: The noise extraction section 51 of the CPU 14 performs, by using the reduced image 31a, weighted average processing with the use of the bilateral filter in the equation (2) and the equation (3). The noise extraction section 51 calculates a reduced image 60 as a result of reducing a noise component in a frequency band corresponding to the reduction ratio of 1/4 (referred to as a low frequency band, hereinafter). The noise extraction section 51 subtracts a pixel value $d'_i$ of pixel i of the reduced image 60 from a pixel value $d_i$ of pixel i of the reduced image 31a, thereby extracting noise data 61 in the low frequency band in each pixel i of the reduced image 31a.

Step S304: The CPU 14 judges whether or not the noise data extracted in step S303 is one extracted from the reduced image with the minimum reduction ratio. When it is judged that the noise data is the one extracted from the reduced image with the minimum reduction ratio, the CPU 14 proceeds to step S305 (YES side). Meanwhile, when it is judged that the noise data is not the one extracted from the reduced image with the minimum reduction ratio, the CPU 14 proceeds to step S307 (NO side).

Step S305: The noise reduction section 52 of the CPU 14 converts the extracted noise data 61 into noise data 62 in the low frequency band in each pixel of the target image 30a with the reduction ratio of 1/1. The noise reduction section 52 subtracts a noise component of the noise data 62 from a pixel value of each pixel of the target image 30a, thereby calculating a target image 63 as a result of reducing the noise component in the low frequency band superimposed on the target image 30a. Note that the target image 63 includes a noise component in a frequency band corresponding to the reduction ratio of 1/1 (namely, a size of the target image) (referred to as a high frequency band, hereinafter).

Step S306: The CPU 14 judges whether or not the processing with respect to the reduced images with all of the reduction ratios is completed. When the CPU 14 judges that the processing with respect to the reduced images with all of the reduction ratios is completed, it proceeds to step S308 (YES side).

Meanwhile, when the CPU 14 judges that the processing with respect to the reduced images with all of the reduction ratios is not completed, it proceeds to step S303 (NO side) and performs the processing on the reduced image with the next minimum reduction ratio, similar to a case of the first embodiment.

Step S307: When the plurality of reduced images with different reduction ratios are generated in step S302, the noise reduction section 52 adds the noise component in the frequency band corresponding to the reduction ratio extracted in step S303 and the noise component extracted, up to this time, sequentially from the reduced image with the minimum reduction ratio, to thereby generate new noise data, similar to the case of step S107 in the first embodiment.

Step S308: The noise reduction section 52 performs the weighted average processing with the use of the bilateral filter in the equation (2) and the equation (3) again on the target image 63 as a result of reducing the noise component in the low frequency band. The noise reduction section 52 generates a target image 64 as a result of reducing a noise component in a high frequency band.

Further, the noise reduction section 52 performs, by using the target image 64 as a result of reducing the noise in the low frequency band and the high frequency band and the reference image 30b, weighted average processing with the use of the bilateral filter in the equation (2) and the equation (4). The noise reduction section 52 generates a target image 65 as a result of reducing a variation component in a time direction superimposed on the target image 64.

Step S309: The compression processing section 23 of the CPU 14 performs, in accordance with a moving image format such as H.264 and Motion JPEG, moving image compression on the target image 65 to generate moving image data. The CPU 14 temporarily records the moving image data in the memory 15. At the same time, the CPU 14 records the target image 65 in the memory 15 to set it as the reference image 30b with respect to the target image 30a of the next frame.

Step S310: The CPU 14 judges whether or not it receives an instruction to terminate the capturing of moving image, based on a release of the full depression of release button of the operation section 16 made by the user, for example. When the CPU 14 judges that it receives the instruction to terminate the capturing of moving image (YES side), it generates a moving image file from the moving image data temporarily recorded in the memory 15, and records the file in the memory 15 or the storage medium 19. The CPU 14 terminates the series of processing. Meanwhile, when the CPU 14 judges that it does not receive the instruction to terminate the capturing of moving image, it proceeds to step S301 (NO side). The CPU 14 performs the processing from step S301 to step S309 with respect to the target image 30a of the second frame or thereafter, until it receives the instruction of termination.

As described above, in the present embodiment, the plurality of reduced images with different reduction ratios are generated, and the noise components are obtained sequentially from the noise component in the frequency band corresponding to the minimum reduction ratio, so that even when the noise intensity is high, the noise reduction can be performed with high accuracy.

Further, since the weighting coefficient w in the bilateral filter is set to the product of weighting coefficients of respective components represented by the Gaussian function, when, for example, a variation in pixel values in accordance with a motion of the subject is large or the noise intensity is high, the value of pixel value component wd becomes very small, resulting in that the weighting coefficient w becomes very small as well. Accordingly, in the noise reduction processing of the present embodiment, it is possible to suppress influences of the variation in the pixel values in accordance with the motion of the subject or the noise intensity, which enables to highly accurately perform the noise reduction on the moving image.

Further, by separately reducing the noise components being the variation components in the spatial direction and the time direction using each of the equation (3) and the equation (4), it is possible to realize not only the reduction in the load of the processing operation but also the reduction in the circuit scale of the digital camera 1'.

Fourth Embodiment

Figure 9:
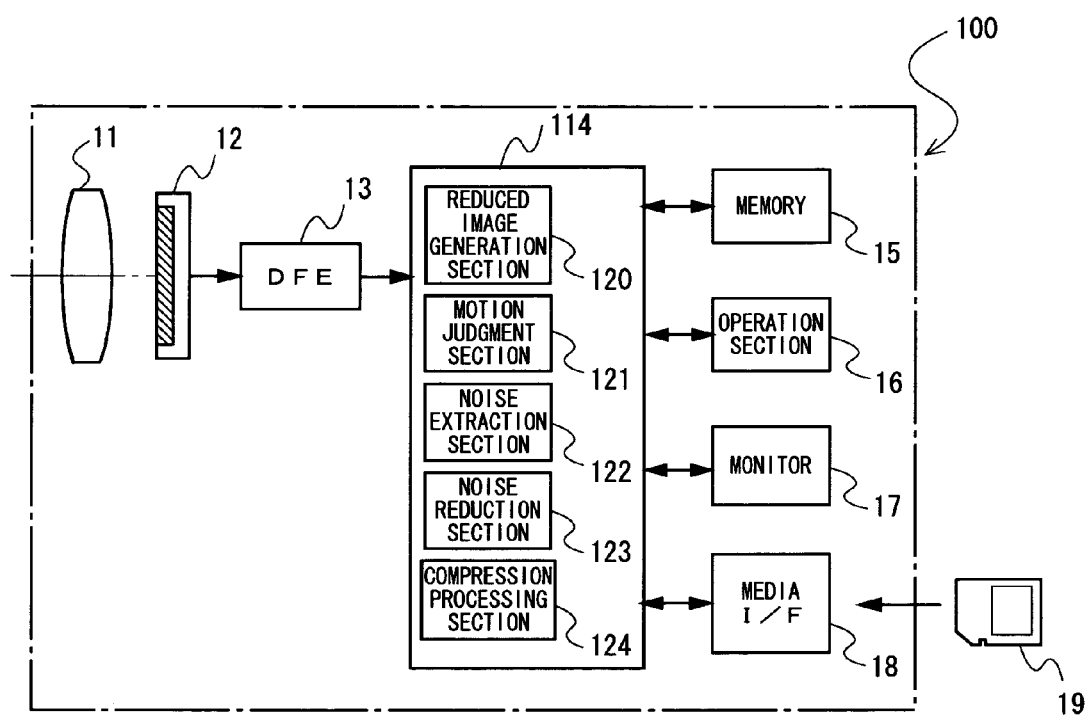
FIG. 9 is a block diagram illustrating an example of a configuration of a digital camera 100 according to a fourth embodiment.

FIG. 9 is a block diagram illustrating an example of a configuration of a digital camera 100 according to a fourth embodiment.

In the digital camera 100 according to the present embodiment, a component which operates in the same manner as the component of the digital camera 1 according to the first embodiment illustrated in FIG. 1 is denoted by the same reference numeral, and detailed explanation thereof will be omitted.

A CPU 114 is a processor that comprehensively controls respective parts of the digital camera 100. For instance, the CPU 114 executes each of AF control using well-known contrast detection, well-known AE calculation and the like, based on an output of the image sensor 12. Further, the CPU 114 performs digital processing on image data from the DFE 13. As an example, the digital processing includes interpolation processing, white balance processing, gradation conversion processing, edge enhancement processing, color conversion processing and the like. Further, when an image processing program is executed, the CPU 114 of the present embodiment operates as a reduced image generation section 120, a motion judgment section 121, a noise extraction section 122, a noise reduction section 123 and a compression processing section 124.

The reduced image generation section 120 generates, by using a well-known method, a reduced image of each frame of a moving image captured by the image sensor 12. The reduced image generation section 120 of the present embodiment generates two reduced images of one frame (target image) at reduction ratios of 1/4 and 1/16 (first reduced images). Further, the reduced image generation section 120 also generates reduced images of a reference image to be a reference of noise reduction processing at reduction ratios of 1/4 and 1/16 (second reduced images). Note that the reference image in the present embodiment is set to a frame which is one frame before the target image in the moving image, and an image to which noise reduction is applied. Further, the well-known method in the present embodiment is set to, for example, multiresolution analysis and Nearest Neighbor method.

The motion judgment section 121 uses the reduced images of the target image and the reference image reduced at the same reduction ratio, as one pair, and judges, by comparing the one pair of reduced images of the target image and the reference image, whether or not a subject is moved in each pixel of the reduced image of the target image. To achieve that, the motion judgment section 121 of the present embodiment calculates average values $<ds_i>$ (first average value) and $<dr_i>$ (second average value) of pixel values $ds_i$ (j) and $dr_i$ (j) in target areas A in which pixel positions of pixels i being processing targets in the one pair of reduced images of the target image and the reference image are set as centers. Note that $ds_i$ (j) and $dr_i$ (j) indicate pixel values of pixels j in the target areas A in which the pixels i of the reduced images of the target image and the reference image, respectively, are set as centers, and a relation of the pixel j E the target area A is satisfied. Further, a size of the target area A is preferably determined in accordance with an image size of the target image and the reference image, the processing capability of the CPU 114, the reduction ratio or the like, and is 3 pixels×3 pixels, 5 pixels×5 pixels, or the like.

The motion judgment section 121 calculates an absolute value $|<ds_i>-<dr_i>|$ of a difference between the average value $<ds_i>$ and the average value $<dr_i>$, and performs, based on a comparison between the absolute value and a threshold value D, motion judgment of subject at the pixel position of the pixel i. Specifically, the motion judgment section 121 judges that the subject at the pixel position of the pixel i is moved when the absolute value of the difference is greater than the threshold value D, and it judges that the subject at the pixel position of the pixel i is in a stationary state when the absolute value is equal to or less than the threshold value D. When the motion judgment section 121 judges that the subject at the pixel position of the pixel i is moved, it holds information regarding the pixel position of the pixel i and the target area A in the memory 15.

Note that it is designed such that the threshold value D is set to 2 to 4 or the like when, for example, ISO sensitivity is 3200 and an image has gradation of 0 to 255. However, the threshold value D is preferably determined in accordance with a target of subject to be captured, ISO sensitivity with which the subject is captured, and the like.

Further, the threshold value D may also be changed in accordance with the reduction ratio. Specifically, for example, when the threshold value D is set to $\alpha_1$ with respect to the target image having the original image size (reduction ratio of 1/1), it is also possible that the threshold value D with respect to the reduced image with the reduction ratio of 1/4 is set to $\alpha_1/2$, the threshold value D with respect to the reduced image with the reduction ratio of 1/16 is set to $\alpha_1/4$, and the like.

Further, the motion of the subject in the present embodiment is set to include not only the motion of the subject him/her/itself but also a motion of the subject made by a hand movement of a person who performs shooting, a pan motion of the digital camera 100 and the like.

The noise extraction section 122 extracts, based on a judgment result made by the motion judgment section 121, a noise component superimposed on a pixel value of the pixel i of the reduced image of the target image by using the pixel values $ds_i(j)$ and $dr_i(j)$ in the target areas A described above. Specifically, when the motion judgment section 121 judges that the subject is moved, the noise extraction section 122 performs weighted average processing on a pixel value $ds_i(i)$ of the pixel i of the reduced image of the target image by using only the pixel value $ds_i(j)$ in the target area A of the reduced image of the target image. Meanwhile, when it is judged that the subject is in a stationary state, the noise extraction section 122 performs the weighted average processing on the pixel value $ds_i(i)$ of the pixel i of the reduced image of the target image by using the pixel values $ds_i(j)$ and $dr_i(j)$ in the target areas A of the one pair of reduced images of the target image and the reference image. Note that the weighted average processing performed by the noise extraction section 122 is one that is conducted using a bilateral filter as represented by an equation (5), for example.

$$d's_i(i) = \frac{\sum_{j \in S} w_j \cdot d_i(j)}{\sum_{j \in S} w_j} \quad (5)$$

Here, $d's_i(i)$ indicates a pixel value, to which the weighted average is applied, of the pixel i of the reduced image of the target image. When it is judged that the subject is moved, an area S in the equation (5) indicates only the target area A in which the pixel position of the pixel i of the reduced image of the target image is set as a center, and $d_i(j)$ indicates the pixel value $ds_i(j)$ in the target area A. Meanwhile, when it is judged that the subject is in a stationary state, the area S in the equation (5) indicates an area as a result of combining two target areas A of the reduced images of the target image and the reference image, and $d_i(j)$ indicates the pixel values $ds_i(j)$ and $dr_i(j)$ in the target areas A. Further, w in the equation (5) indicates a weighting coefficient, and is represented by a product of weighting coefficients of a spatial component wx, a pixel value component wd and a time component wt of a Gaussian function, as represented by the following equation (6).

$$w_j = wx_j \cdot wd_j \cdot wt_j \quad (6)$$
$$= \exp\left(-\frac{|x_i - x_j|^2}{2\sigma_1^2}\right) \cdot \exp\left(-\frac{|ds_i(i) - d_i(j)|^2}{2\sigma_2^2}\right) \cdot \exp\left(-\frac{|t_i - t_j|^2}{2\sigma_3^2}\right)$$

Here, x indicates space coordinates of pixels of the reduced images of the target image and the reference image and formed of components in a horizontal scanning direction and in a vertical scanning direction. t indicates time coordinates of the reduced images of the target image and the reference image. Note that it is set that the time coordinate t in the present embodiment indicates a frame number. Therefore, when it is judged that the subject is moved, the time coordinate $t_i$ becomes equal to $t_j$ and wt takes 1, so that the noise extraction section 122 performs the weighted average processing in which only the variation in the spatial direction is taken into consideration. Meanwhile, when it is judged that the subject is in a stationary state, the time coordinate $t_i$ does not become equal to $t_j$ between the reduced images of the target image and the reference image, so that the noise extraction section 122 performs the weighted average processing in which the variation in the time direction is also taken into consideration. Note that it is preferable that values of $\sigma_1$, $\sigma_2$, $\sigma_3$ of respective components in the present embodiment are appropriately selected to be set in accordance with a required accuracy of noise reduction processing and the like.

The noise extraction section 122 performs, on all of the pixels i, the weighted average processing using the bilateral filter described above, thereby generating a reduced image of the target image having the pixel value $d's_i(i)$. Note that the generated reduced image is an image as a result of reducing the noise component in the frequency band corresponding to the reduction ratio. Therefore, the noise extraction section 122 determines a difference between the pixel value $ds_i(i)$ of the target image to which the weighted average processing is not yet applied and the pixel value $d's_i(i)$ as a result of applying the weighted average processing, to extract a noise component $N_k$ in the frequency band corresponding to the reduction ratio, and outputs it as noise data. Note that k indicates each reduction ratio.

The noise reduction section 123 uses the extracted noise data in the plurality of frequency bands to reduce a noise superimposed on the target image. Here, the noise component $N_k$ of the noise data in each frequency band corresponds to each pixel of the reduced image of the target image reduced at the reduction ratio of k corresponding to the frequency band. Accordingly, the noise reduction section 123 converts the noise data in each frequency band into noise data in each pixel of the original target image. The noise reduction section 123 subtracts and reduces the converted noise data of the noise component in each frequency band from the original target image.

Further, the noise reduction section 123 of the present embodiment reduces, after reducing all of the noise components in the frequency bands described above, a noise component in a high frequency band superimposed on the target image itself, with the use of the motion judgment section 121 and the noise extraction section 122 in a combined manner. Specifically, by using the pixel value $ds_i$ (j) and the pixel value $dr_i$ (j) in the target areas A in which the pixel positions of pixels i of the target image and the reference image are set as centers, the motion judgment section 121 performs the motion judgment of subject at the pixel position of the pixel i, as described above. In accordance with a result of the motion judgment, the noise extraction section 122 extracts the noise component in the high frequency band superimposed on the pixel value of the pixel i of the target image, based on the weighted average processing performed by using the bilateral filter in the equation (5) and the equation (6). The noise reduction section 123 reduces the noise component in the high frequency band superimposed on the target image itself.

Note that on each of the reduced images, not only the noise component in the frequency band corresponding to its own reduction ratio but also a noise component in a low frequency band included in a smaller reduced image is superimposed. Accordingly, the noise reduction section 123 of the present embodiment converts the noise data extracted by the noise extraction section 122 into not only the noise data in each pixel of the original target image but also noise data in each pixel of a reduced image whose reduction ratio is larger than that of the reduced image. The noise reduction section 123 reduces, by using the converted noise data, a noise component in a lower frequency band superimposed on each of the reduced images. Accordingly, the noise extraction section 122 can highly accurately extract, from each of the reduced images, the noise component in the frequency band corresponding to the reduction ratio of each of the reduced images.

The compression processing section 124 performs, in accordance with a moving image format such as H.264 and Motion PEG, moving image compression on the target image as a result of reducing the noise components in the respective frequency bands, thereby generating moving image data.

Figure 10:
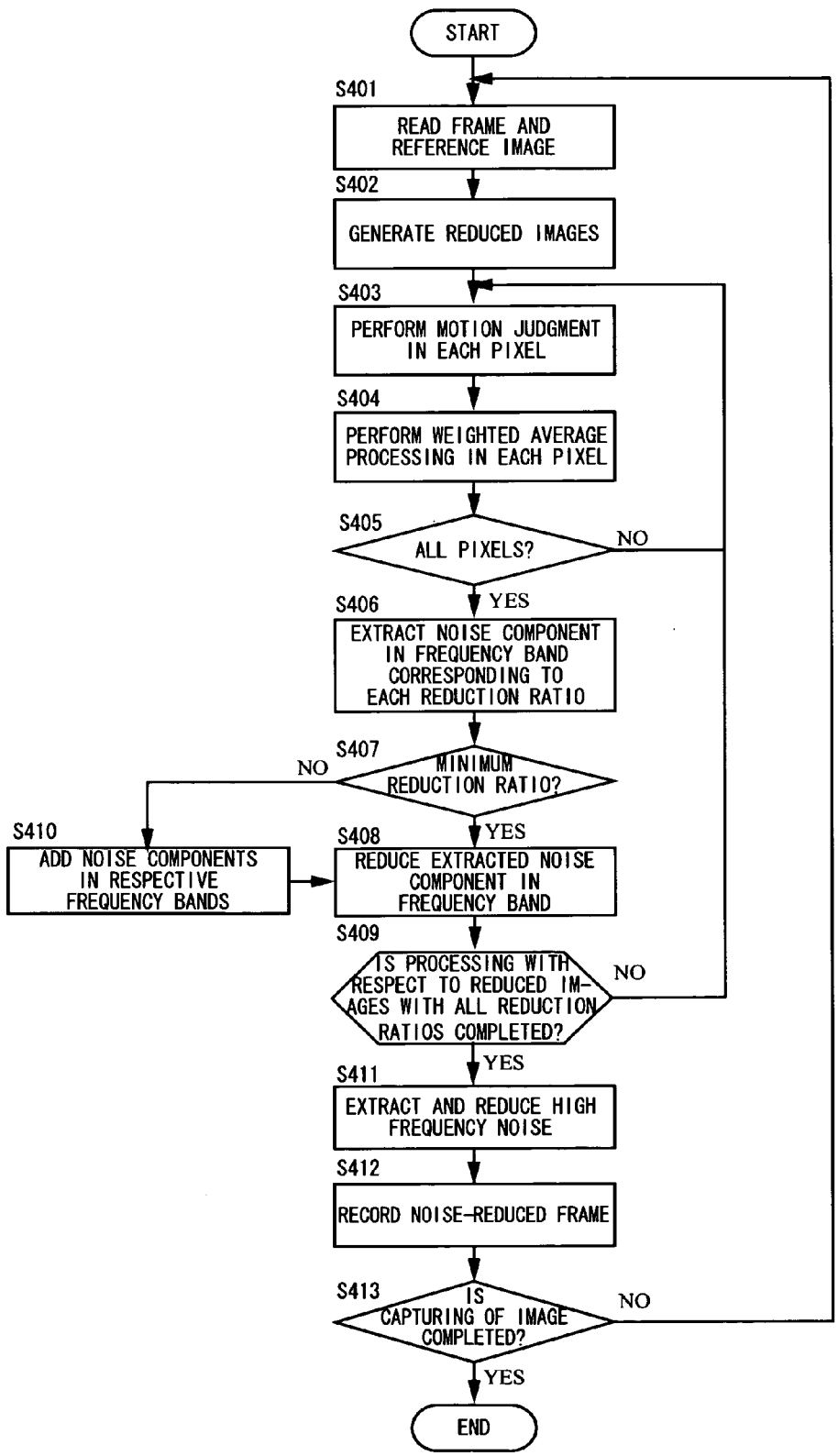
FIG. 10 is a flow chart illustrating an example of noise reduction processing performed by the digital camera 100 according to the fourth embodiment.
Figure 11:
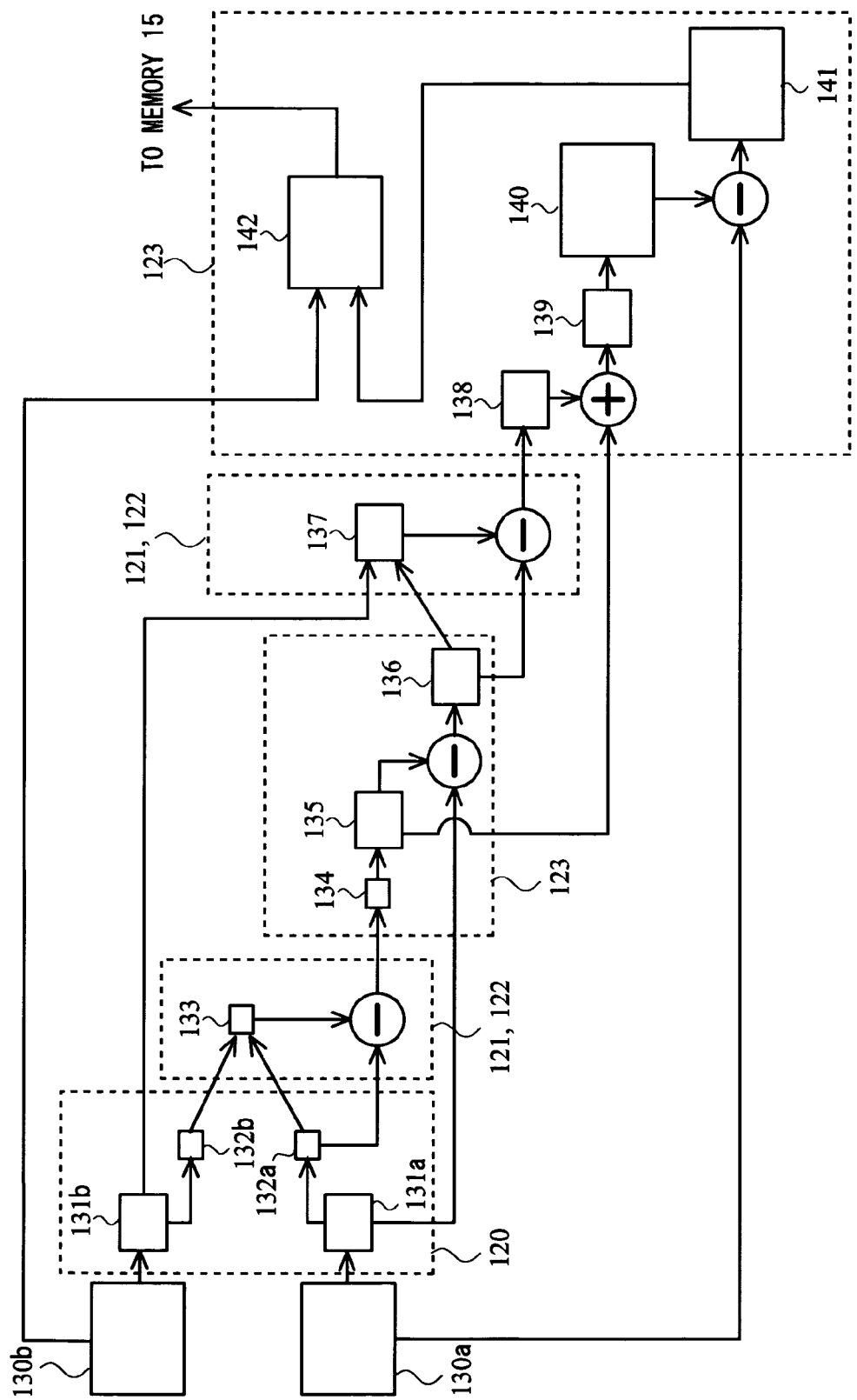
FIG. 11 is a diagram illustrating an example of a flow of image data in the noise reduction processing illustrated in FIG. 10.

Next, a processing operation performed by the digital camera 100 according to the present embodiment will be explained, while referring to a flow chart in FIG. 10 and a flow chart of image data in FIG. 11.

Note that as described above, on the reduced image, not only the noise component in the frequency band corresponding to its own reduction ratio but also the noise component in the lower frequency band included in the smaller reduced image is superimposed. Conversely, the reduced image does not include a noise component in a higher frequency band included in an image whose image size is larger than that of the reduced image. Accordingly, it is set that processing in the present embodiment is started to be performed on the reduced image with the minimum reduction ratio first, so that the noise component in the frequency band corresponding to the reduction ratio of each of the reduced images can be efficiently extracted from each of the reduced images.

Upon receiving an instruction to capture a moving image from a user (a full depression operation of release button included in the operation section 16 or the like, for instance), the CPU 114 makes the image sensor 12 start capturing a moving image of a subject. The CPU 114 starts processing from step S401.

Step S401: The CPU 114 reads, via the DFE 13, a first frame output from the image sensor 12 as a target image 130a. At the same time, the CPU 114 sets the target image 130a as a reference image 130b of noise reduction processing. Note that the reference image 130b with respect to the target image 130a of a second frame or thereafter is set to a frame which is one frame before the target image and to which the noise reduction of the present embodiment is applied.

Step S402: The reduced image generation section 120 of the CPU 114 generates reduced images of each of the read target image 130a and reference image 130b at reduction ratios of 1/4 and 1/16. In FIG. 11, the reduced images of the frame 130a with the reduction ratios of 1/4 and 1/16 (first reduced images) are denoted by reference numerals and letters 131a and 132a, and the reduced images of the reference image 130b with the reduction ratios of 1/4 and 1/16 (second reduced images) are denoted by reference numerals and letters 131b and 132b.

Step S403: The CPU 114 reads the reduced images 132a, 132b of the target image 130a and the reference image 130b with the reduction ratio of 1/16. The CPU 114 uses one pair of the reduced images 132a, 132b, and performs judgment whether or not a subject is moved at a pixel position of pixel i of the reduced image 132a, by using pixel values $ds_i$ and $dr_i$ in target areas A in which pixel positions of pixels i are set as centers. Specifically, the motion judgment section 121 calculates average values $<ds_i>$ and $<dr_i>$ of the pixel values $ds_i$ and $dr_i$ in the target areas A, and judges whether or not an absolute value $|<ds_i>-<dr_i>|$ of a difference between the average values is greater than a threshold value D. When the absolute value of the difference is greater than the threshold value D, the motion judgment section 121 judges that the subject at the pixel position of the pixel i of the reduced image 132a is moved, and holds the pixel position of the pixel i in the memory 15, for example. Meanwhile, when the absolute value is equal to or less than the threshold value D, the motion judgment section 121 judges that the subject at the pixel position of the pixel i of the reduced image 132a is in a stationary state.

Step S404: In accordance with a result of the motion judgment of subject at the pixel i achieved in step S403, the noise extraction section 122 of the CPU 114 performs weighted average processing with the use of the bilateral filter in the equation (5) and the equation (6). Specifically, when it is judged that the subject is moved, the noise extraction section 122 performs the weighted average processing by setting the target area A of the reduced image 132a as the area S in the equation (5) and the pixel value $ds_i$ (j) in the target area A as $d_i$ (j) in the equation (5). Meanwhile, when it is judged that the subject is in a stationary state, the noise extraction section 122 performs the weighted average processing by setting an area as a result of combining the respective target areas A of the reduced images 132a and 132b as the area S in the equation (5) and the pixel values $ds_i$ (j) and $dr_i$ (j) in the target areas A as $d_i$ (j) in the equation (5). The noise extraction section 122 obtains a pixel value $d's_i$ (i) of the pixel i.

Step S405: The CPU 114 judges whether or not it obtains the pixel values $d's_i$ (i) by performing the weighted average processing on all of the pixels i of the reduced image 132a. When the CPU 114 judges that it performs the processing on all of the pixels i, it generates a reduced image 133 of the target image 130a having the pixel values $d's_i$ and the reduction ratio of 1/16, and proceeds to step S406 (YES side). Meanwhile, when the CPU 114 judges that it does not perform the processing on all of the pixels i, it proceeds to step S403 (NO side) and performs the processing in step S403 and step S404 on all of the pixels i, to thereby generate the reduced image 133. Note that the reduced image 133 is an image as a result of reducing a noise component in a frequency band corresponding to the reduction ratio of 1/16 (referred to as a low frequency band, hereinafter).

Step S406: The noise extraction section 122 subtracts the pixel value $d's_i$ (i) of the pixel i of the reduced image 133 from a pixel value $ds_i$ (i) of the pixel i of the reduced image 132a, thereby extracting noise data 134 in the low frequency band corresponding to the reduction ratio of the reduced image 132a.

Step S407: The CPU 114 judges whether or not the noise data extracted in step S406 is one extracted from the reduced image with the minimum reduction ratio. When it is judged that the noise data is the one extracted from the reduced image with the minimum reduction ratio, the CPU 114 proceeds to step S408 (YES side). Meanwhile, when it is judged that the noise data is not the one extracted from the reduced image with the minimum reduction ratio, the CPU 114 proceeds to step S410 (NO side).

Step S408: The noise reduction section 123 of the CPU 114 converts the extracted noise data 134 into noise data 135 in the low frequency band in each pixel of the reduced image 131a with the reduction ratio of 1/4. The noise reduction section 123 subtracts a noise component of the noise data 135 from a pixel value of each pixel of the reduced image 131a, thereby calculating a reduced image 136 as a result of reducing the noise component in the low frequency band superimposed on the reduced image 131a. Note that the reduced image 136 includes a noise component in a frequency band corresponding to the reduction ratio of 1/4 (referred to as a middle frequency band, hereinafter).

Step S409: The CPU 114 judges whether or not the processing with respect to the reduced images with all of the reduction ratios is completed. When the CPU 114 judges that the processing with respect to the reduced images with all of the reduction ratios is completed, it proceeds to step S411 (YES side).

Meanwhile, when the CPU 114 judges that the processing with respect to the reduced images with all of the reduction ratios is not completed, it proceeds to step S403 (NO side). The CPU 114 performs the processing from step S403 to step S405 on the reduced image 136 with the reduction ratio of 1/4 as a result of reducing the noise component in the low frequency band and the reduced image 131b of the reference image 130b with the reduction ratio of 1/4. In step S405, the noise extraction section 122 generates a reduced image 137 with a reduction ratio of 1/4 as a result of reducing the noise component in the middle frequency band. In step S406, the noise extraction section 122 subtracts a pixel value d's$_i$ (i) of pixel i of the reduced image 137 from a pixel value ds$_i$ (i) of pixel i of the reduced image 136, thereby extracting noise data 138 of the noise component in the middle frequency band. The CPU 114 proceeds to step S410 (NO side) in step S407.

Note that it is designed such that in step S403 of the present embodiment, the motion judgment section 121 performs, by using a result of the motion judgment with respect to the reduced images 132a, 132b, the motion judgment of subject at the pixel position of the pixel i of the reduced image 136. Specifically, the motion judgment section 121 reads the judgment result with respect to the reduced images 132a, 132b held in the memory 15. The motion judgment section 121 judges, when the reduced image 136 is reduced at a reduction ratio of 1/4, for example, whether or not the pixel position of the pixel i of the reduced image 136 coincides with the pixel position of the pixel of the reduced image 132a at which the subject is judged to be moved. When the motion judgment section 121 judges that the positions coincide with each other, it holds, in the memory 15, the pixel position of the pixel i of the reduced image 136 as the pixel position at which the subject is moved. Meanwhile, when the positions do not coincide with each other, the motion judgment section 121 performs normal motion judgment by using pixel values ds$_i$ and dr$_i$ in target areas A in which pixel positions of pixels i of the reduced image 136 and the reduced image 131b are set as centers. When the motion judgment section 121 judges that the subject is moved at the pixel position of the pixel i of the reduced image 136, it holds the pixel position of the pixel i in the memory 15.

Step S410: The noise reduction section 123 adds, in each pixel, the noise components of the noise data 135 in the low frequency band and the noise data 138 in the middle frequency band, thereby generating noise data 139 in the low and middle frequency bands.

The noise reduction section 123 converts, in step S408, the noise data 139 in the low and middle frequency bands into noise data 140 in the low and middle frequency bands in each pixel of the original target image 130a. The noise reduction section 123 subtracts a noise component of the noise data 140 from a pixel value of each pixel of the original target image 130a, thereby generating a target image 141 as a result of reducing the noise components in the low and middle frequency bands superimposed on the target image 130a. The CPU 114 proceeds to step S411 (YES side) in step S409.

Step S411: By using the reference image 130b, the CPU 114 reduces a noise component in a high frequency band superimposed on a pixel i of the target image 141 as a result of reducing the noise in the low and middle frequency bands. Concretely, the motion judgment section 121 performs, by using a pixel value ds$_i$ and a pixel value dr$_i$ in target areas A in which pixel positions of pixels i of the target image 141 and the reference image 130b are set as centers, the motion judgment of subject at the pixel position of the pixel i. In accordance with a result of the motion judgment, the noise extraction section 122 extracts the noise component in the high frequency band superimposed on the pixel value of the pixel i of the target image, based on the weighted average processing using the bilateral filter in the equation (5) and the equation (6). The noise reduction section 123 reduces the noise component in the high frequency band superimposed on the target image 141 itself, to thereby generate a target image 142.

Note that it is designed such that the motion judgment section 121 of the present embodiment performs, by using a result of the motion judgment with respect to the reduced images 136, 131b, the motion judgment of subject at the pixel position of the pixel i of the target image 141. Specifically, the motion judgment section 121 reads the judgment result with respect to the reduced images 136, 131b held in the memory 15. The motion judgment section 121 judges, when the target image 141 is reduced at a reduction ratio of 1/4, for example, whether or not the pixel position of the pixel i of the target image 141 coincides with the pixel position of the pixel of the reduced image 136 at which the subject is judged to be moved. When the motion judgment section 121 judges that the positions coincide with each other, it judges that the subject is moved at the pixel position of the pixel i of the target image 141. Meanwhile, when the positions do not coincide with each other, the motion judgment section 121 performs normal motion judgment by using pixel values ds$_i$ and dr$_i$ in target areas A in which pixel positions of pixels i of the target image 141 and the reference image 130b are set as centers.

Step S412: The compression processing section 124 of the CPU 114 performs, in accordance with a moving image format such as H.264 and Motion JPEG, moving image compression on the target image 142 as a result of reducing the noise components in the frequency bands ranging from the low frequency band to the high frequency band, thereby generating moving image data. The CPU 114 temporarily records the moving image data in the memory 15. At the same time, the CPU 114 records the target image 142 in the memory 15 to set it as the reference image 130b with respect to the target image 130a of the next frame.

Step S413: The CPU 114 judges whether or not it receives an instruction to terminate the capturing of moving image, based on a release of the full depression of release button of the operation section 16 made by the user, for example. When the CPU 114 judges that it receives the instruction to terminate the capturing of moving image (YES side), it generates a moving image file from the moving image data temporarily recorded in the memory 15, and records the file in the memory 15 or the storage medium 19. The CPU 114 terminates the series of processing. Meanwhile, when the CPU 114 judges that it does not receive the instruction to terminate the capturing of moving image, it proceeds to step S401 (NO side). The CPU 114 performs the processing from step S401 to step S412 with respect to the target image 130a of the second frame or thereafter, until it receives the instruction of termination.

As described above, in the present embodiment, the plurality of pairs of reduced images with different reduction ratios are generated from one pair of the target image 130a and the reference image 130b, the motion judgment is performed for each pixel of the reduced images of the respective pairs, and the calculation range (area S) of the weighted average processing is adjusted in accordance with the judgment result, so that even if the subject is moved, it is possible to highly accurately perform the noise reduction on the moving image and the like, with no chance of blurring of image of the subject.

Further, by performing the motion judgment of subject from one pair of the reduced images with the minimum reduction ratio to extract the noise component in the frequency band corresponding to the minimum reduction ratio first, it is possible to efficiently perform the noise reduction while preventing the influence of motion of the subject from reaching the reduced image having another reduction ratio with a large image size.

Fifth Embodiment

A digital camera according to a fifth embodiment of the present application has the same configuration as that of the digital camera 100 according to the fourth embodiment in FIG. 9, so that detailed explanation of respective components will be omitted.

Figure 12:
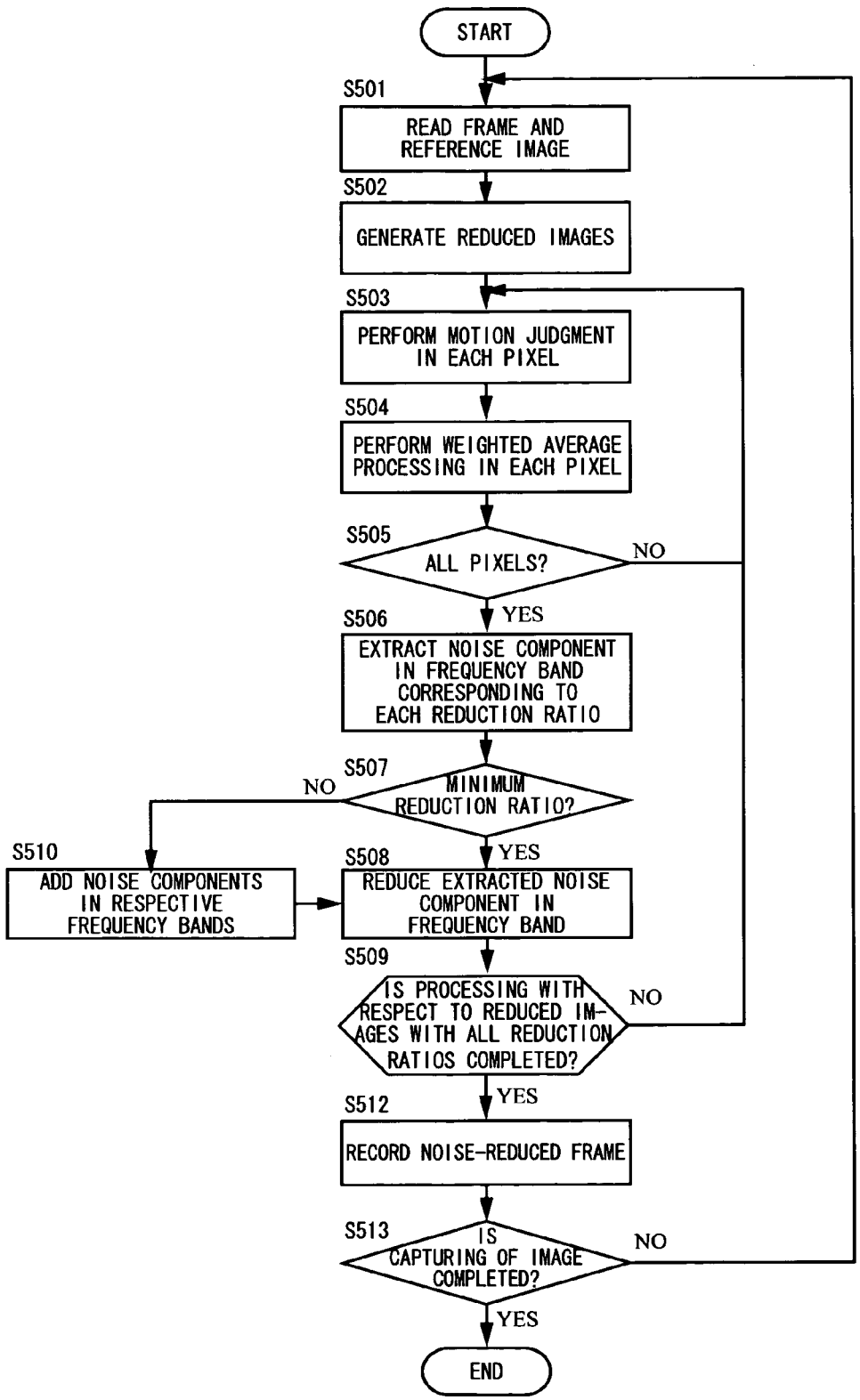
FIG. 12 is a flow chart illustrating an example of noise reduction processing performed by a digital camera 100 according to a fifth embodiment.

FIG. 12 illustrates a flow chart of a processing operation performed by a digital camera 100 of the present embodiment. In FIG. 12, processing similar to that of the fourth embodiment illustrated in FIG. 10 is denoted by a step number whose last two digits are the same as those of the step number of the processing in the fourth embodiment, and detailed explanation thereof will be omitted.

Figure 13:
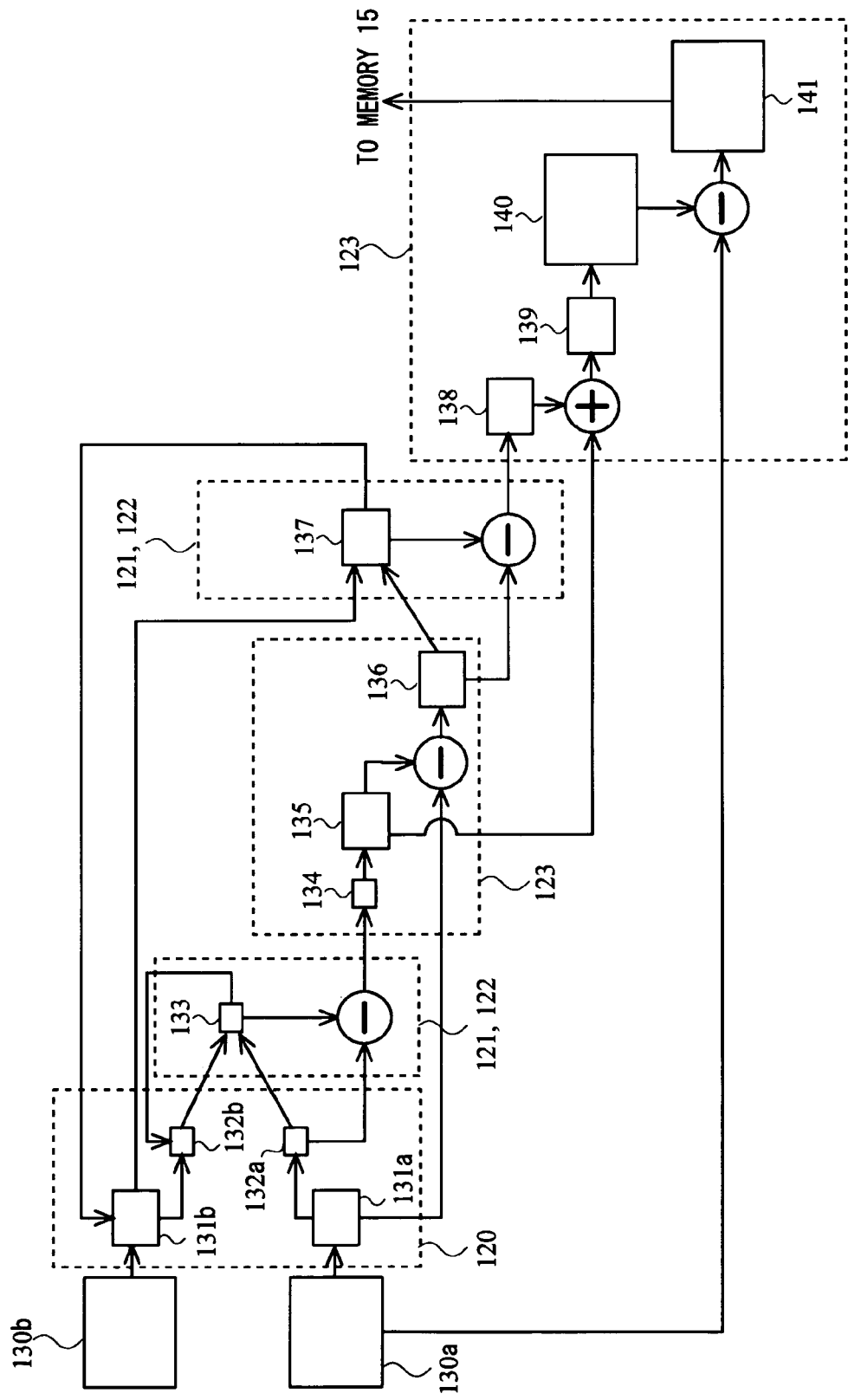
FIG. 13 is a diagram illustrating an example of a flow of image data in the noise reduction processing illustrated in FIG. 12.

FIG. 13 illustrates a flow of image data in the processing illustrated in FIG. 12. In FIG. 13, image data which are the same as the image data in the fourth embodiment illustrated in FIG. 11 are denoted by the same reference numerals and letters, and detailed explanation thereof will be omitted.

A point in which the processing operation performed by the digital camera 100 according to the present embodiment differs from the processing operation according to the fourth embodiment is that the noise reduction processing in the high frequency band in step S411 is omitted. This is because moving image compression processing for converting the target image 141 into moving image data performed by the compression processing section 124 in step S512 (which corresponds to step S412) has an effect similar to that of reducing the noise component in the high frequency band.

Further, since the processing in step S411 is omitted, the target image 142 is not calculated. Accordingly, the reduced image generation section 120 does not generate, in step S502, the reduced images 131b, 132b of the reference image 130b of the second frame or thereafter. Further, in step S512, the CPU 114 records the reduced images 133, 137 in the memory 15 to set them as the reduced images 132b and 131b of the reference image 130b with the reduction ratios of 1/16 and 1/4. The CPU 114 reads, in step S501, the reduced images 131b, 132b from the memory 15.

As described above, in the present embodiment, the plurality of pairs of reduced images with different reduction ratios are generated from one pair of the target image 130a and the reference image 130b, the motion judgment is performed for each pixel of the reduced images of the respective pairs, and the calculation range (area S) of the weighted average processing is adjusted in accordance with the judgment result, so that even if the subject is moved, it is possible to highly accurately perform the noise reduction on the moving image and the like, with no chance of blurring of image of the subject.

Further, by performing the motion judgment of subject from one pair of the reduced images with the minimum reduction ratio to extract the noise component in the frequency band corresponding to the minimum reduction ratio first, it is possible to efficiently perform the noise reduction while preventing the influence of motion of the subject from reaching the reduced image having another reduction ratio with a large image size.

Further, by performing the moving image compression processing in substitution for the noise reduction in the high frequency band, it is possible to realize the reduction in the processing time of the noise reduction processing performed by the digital camera 100 and the reduction in the processing load, which enables to reduce the circuit scale of the digital camera 100.

Further, by omitting the generation processing of the reduced images of the reference image 130b of the second frame or thereafter performed by the reduced image generation section 120, it is possible to realize further reduction in the processing time of the noise reduction processing and further reduction in the processing load, which enables to further reduce the circuit scale of the digital camera 100.

Sixth Embodiment

Figure 14:
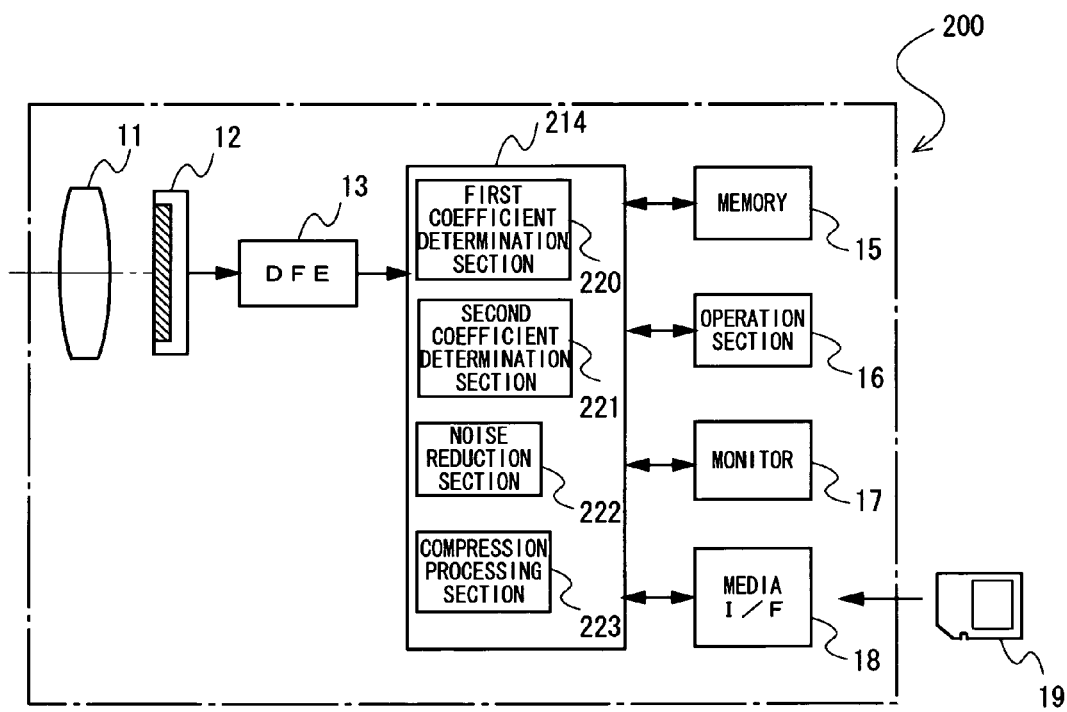
FIG. 14 is a block diagram illustrating an example of a configuration of a digital camera 200 according to a sixth embodiment.

FIG. 14 is a block diagram illustrating an example of a configuration of a digital camera 200 according to a sixth embodiment of the present application.

In the digital camera 200 according to the present embodiment, a component which operates in the same manner as the component of the digital camera 1 according to the first embodiment illustrated in FIG. 1 is denoted by the same reference numeral, and detailed explanation thereof will be omitted.

A CPU 214 is a processor that comprehensively controls respective parts of the digital camera 200. For instance, the CPU 214 executes each of AF control using well-known contrast detection, well-known AE calculation and the like, based on an output of the image sensor 12. Further, the CPU 214 performs digital processing on image data from the DFE 13. As an example, the digital processing includes interpolation processing, white balance processing, gradation conversion processing, edge enhancement processing, color conversion processing and the like. Note that in the present embodiment, it is set such that respective pixels of image data have pixel values of all color components of RGB through the digital processing.

Further, when an image processing program is executed, the CPU 214 of the present embodiment operates as a first coefficient determination section 220, a second coefficient determination section 221, a noise reduction section 222 and a compression processing section 223.

The noise reduction section 222 conducts, by using a modified recursive filter as represented by the following equation (7), synthetic processing for performing weighted addition on a target image being a noise reduction target and a reference image to be a reference of noise reduction processing, thereby reducing a noise from the target image.

$$Z_k = \alpha \cdot \beta X_k + (1 - \alpha \cdot \beta) Z_{k-1} \quad (7)$$

Here, $X_k$ is a pixel value of a color component of either R, G or B in a pixel i of the target image, and $Z_{k-1}$ is a pixel value of the same color component in a pixel i of the reference image. $Z_k$ is a pixel value of the target image as a result of reducing a noise from the pixel value $X_k$ with the use of the equation (7). k indicates an order (or time series) at which the respective images are captured, and in the present embodiment, the reference image denoted by k−1 is set to an image captured before the target image denoted by k by one image and to which the noise reduction is applied.

Figure 15A:
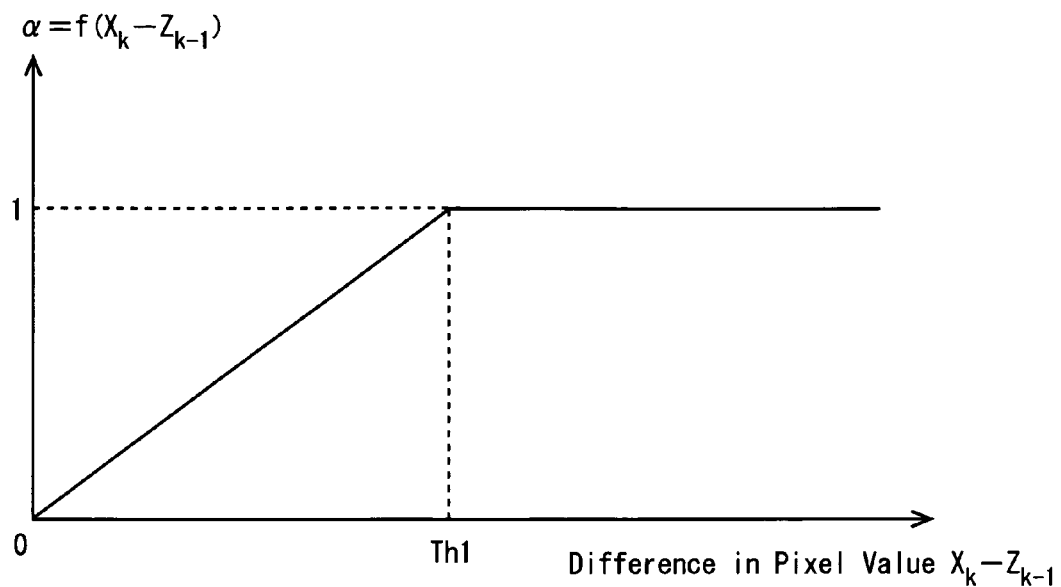
FIG. 15A is a diagram illustrating an example of a function f that determines a coefficient α.

A coefficient α in the equation (7) is a coefficient for determining, in the synthetic processing between the pixel value $X_k$ and the pixel value $Z_{k-1}$, weighting of the respective pixel values. In the present embodiment, the first coefficient determination section 220 determines a value of the coefficient α based on a function f as illustrated in FIG. 15A stored in the memory 15 and a difference in the pixel values ($X_k - Z_{k-1}$). Specifically, the coefficient α is determined as a value which is different for each color component.

Note that the function f illustrated in FIG. 15A is a function in which the difference in pixel values ($X_k - Z_{k-1}$) monotonously increases from 0 to a threshold value Th1, and takes 1 at the threshold value Th1 or greater. Note that although the function f exhibits a linear monotonous increase from 0 to the threshold value Th1 in FIG. 15A, it may also be designed to exhibit a monotonous increase such as a quadratic function and an exponential function. Further, it is designed such that the threshold value Th1 is set to 2 to 4 or the like when, for example, ISO sensitivity is 3200 and an image has gradation of 0 to 255. However, the threshold value Th1 is preferably determined in accordance with a subject to be captured, ISO sensitivity and the like. Furthermore, although the threshold value Th1 in the present embodiment is set to the same value for the color components of RGB, it may also be set to a value which is different for each color component.

Figure 15B:
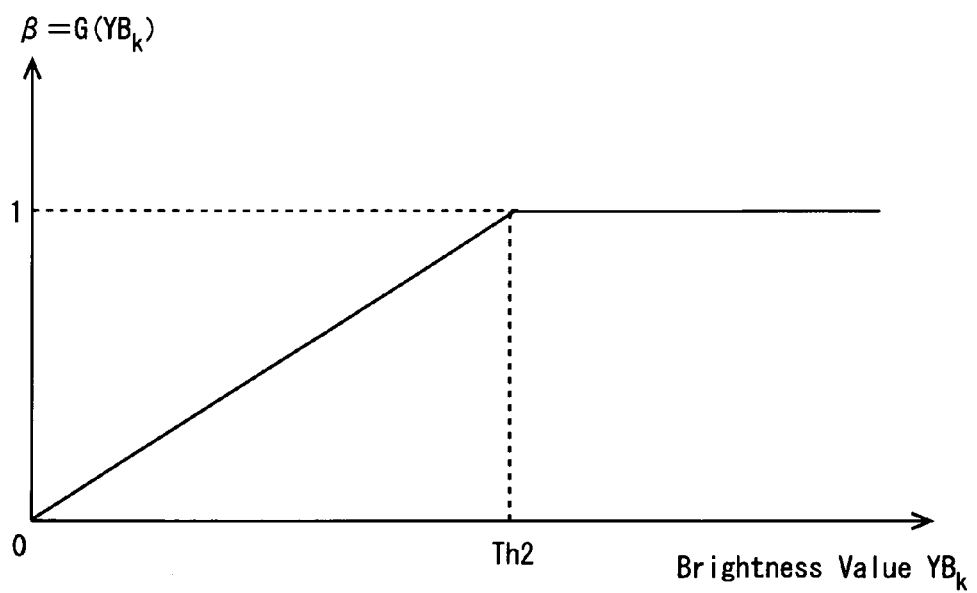
FIG. 15B is a diagram illustrating an example of a function G that determines a coefficient β.

Meanwhile, a coefficient β is a coefficient for adjusting an effect of weighting achieved by the coefficient α in the equation (7), in accordance with a brightness value (brightness information) at a pixel position of pixel i. In the present embodiment, the second coefficient determination section 221 determines a value of the coefficient β based on a function G as illustrated in FIG. 15B stored in the memory 15 and a brightness value $YB_k$ in the pixel i. Specifically, for determining the coefficient β, the second coefficient determination section 221 calculates a brightness value $YX_k$ of the target image and a brightness value $YZ_{k-1}$ of the reference image from pixel values of RGB of the pixels i, by using a well-known conversion method as represented by equations (8), for instance.

$$Y = 0.299 \times R + 0.587 \times G + 0.114 \times B$$

$$Cr = 0.701 \times R - 0.587 \times G - 0.114 \times B$$

$$Cb = -0.299 \times R - 0.587 \times G + 0.886 \times B \quad (8)$$

Further, by using the following equation (9), the second coefficient determination section 221 calculates an average value between the brightness value $YX_k$ and the brightness value $YZ_{k-1}$ to set it as the brightness value $YB_k$ in the pixel i.

$$YB_k = (YX_k + YZ_{k-1})/2 \quad (9)$$

Note that the brightness value $YB_k$ may also be, other than the average value between the brightness value $YX_k$ and the brightness value $YZ_{k-1}$ represented by the equation (9), a value represented by $YB_k = \alpha YX_k + (1-\alpha) YZ_{k-1}$ calculated by using a conventional recursive filter, or an average value of brightness values in an area of 3 pixels×3 pixels, 5 pixels×5 pixels or the like, in which a pixel position of pixel i of the target image and/or the reference image is set as a center.

Further, the function G illustrated in FIG. 15B is a function in which the brightness value $YB_k$ monotonously increases from 0 to a threshold value Th2 and takes 1 at the threshold value Th2 or greater, and noise reduction in a dark part having small brightness values is strongly conducted. Note that although the function G exhibits a linear monotonous increase from 0 to the threshold value Th2 in FIG. 15B, it may also be designed to exhibit a monotonous increase such as a quadratic function and an exponential function. Further, it is designed such that the threshold value Th2 is set to 20 or the like, regardless of ISO sensitivity when, for example, an image has gradation of 0 to 255.

The compression processing section 223 performs, in accordance with a moving image format such as H.264 and Motion JPEG, moving image compression on the target image as a result of reducing the noise, thereby generating moving image data.

Note that the memory 15 of the present embodiment stores the function f and the function G illustrated in FIGS. 15A, 15B, together with image data and respective programs such as the image processing program executed by the CPU 214.

Figure 16:
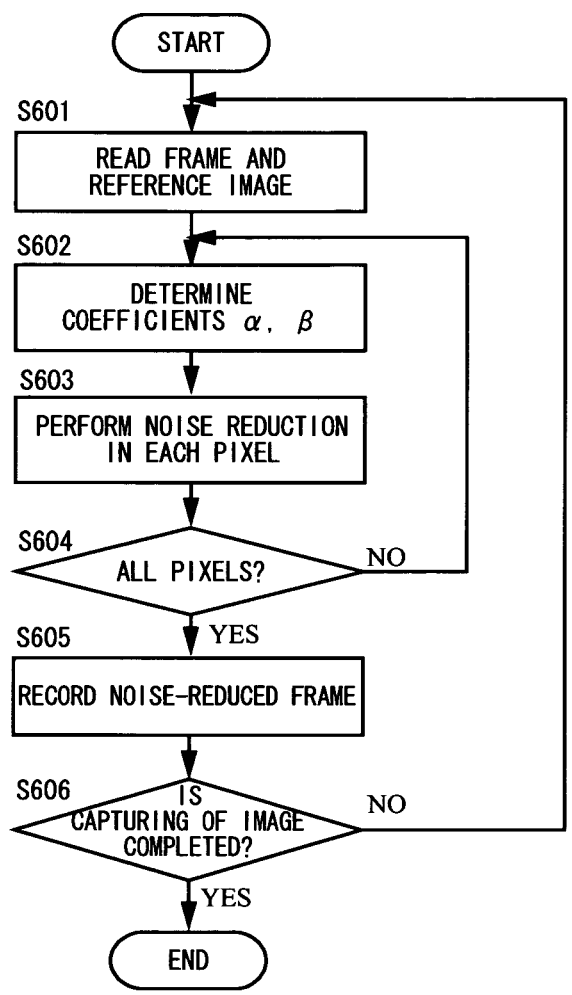
FIG. 16 is a flow chart illustrating an example of noise reduction processing performed by the digital camera 200 according to the sixth embodiment.

Next, a processing operation performed by the digital camera 200 according to the present embodiment will be explained, while referring to a flow chart in FIG. 16.

Upon receiving an instruction to capture a moving image from a user (a full depression operation of release button included in the operation section 16 or the like, for instance), the CPU 214 makes the image sensor 12 start capturing a moving image of a subject. The CPU 214 starts processing from step S601.

Step S601: The CPU 214 reads, via the DFE 13, a first frame (k=1) output from the image sensor 12 as a target image. At the same time, the CPU 214 sets the target image as a reference image of noise reduction processing. Note that the reference image with respect to the target image of a second frame (k≥2) or thereafter is set to a frame which is one frame before the target image and to which the noise reduction of the present embodiment is applied.

Step S602: The first coefficient determination section 220 calculates, for each color component, a difference in pixel values $Z_1 - Z_0$ in pixels i of the read target image and reference image, and determines a value of coefficient α (first coefficient) based on the function f in FIG. 15A. At the same time, the second coefficient determination section 221 calculates a brightness value $YB_1$ in the pixel i using the equations (8) and (9), and determines a value of coefficient β (second coefficient) based on the function G in FIG. 15B.

Step S603: The noise reduction section 222 applies the values of coefficients α, β determined in step S602 to the equation (7), thereby reducing a noise from the pixel value of each color component in the pixel i of the target image.

Step S604: The noise reduction section 222 judges whether or not the noise reduction is performed on all pixels of the target image. When the noise reduction is not performed on all of the pixels, the noise reduction section 222 proceeds to step S602 (NO side), and performs the processing in step S602 and step S603 on all of the pixels, to thereby reduce the noise from the target image. Meanwhile, when the noise reduction is performed on all of the pixels, the noise reduction section 222 proceeds to step S605.

Step S605: The compression processing section 223 performs, in accordance with a moving image format such as H.264 and Motion JPEG, moving image compression on the target image as a result of reducing the noise, thereby generating moving image data. The CPU 214 temporarily records the moving image data in the memory 15. At the same time, the CPU 214 records the target image as a result of reducing the noise in the memory 15 to set it as the reference image with respect to the target image of the next frame.

Step S606: The CPU 214 judges whether or not it receives an instruction to terminate the capturing of moving image, based on a release of the full depression of release button of the operation section 16 made by the user, for example. When the CPU 214 receives the instruction to terminate the capturing of moving image (YES side), it generates a moving image file from the moving image data temporarily recorded in the memory 15, and records the file in the memory 15 or the storage medium 19. The CPU 214 terminates the series of processing. Meanwhile, when the CPU 214 does not receive the instruction to terminate the capturing of moving image, it proceeds to step S601 (NO side). The CPU 214 performs the processing from step S601 to step S605 with respect to the target image of the second frame or thereafter, until it receives the instruction of termination.

As described above, in the present embodiment, since the coefficient α is determined from the difference in pixel values in each pixel of the target image and the reference image, and at the same time, the coefficient β is determined by taking the brightness value in each pixel, namely, a state of brightness of the subject into consideration, the noise reduction can be highly accurately performed at a high speed even on a pixel with a high noise level.

Seventh Embodiment

Figure 17:
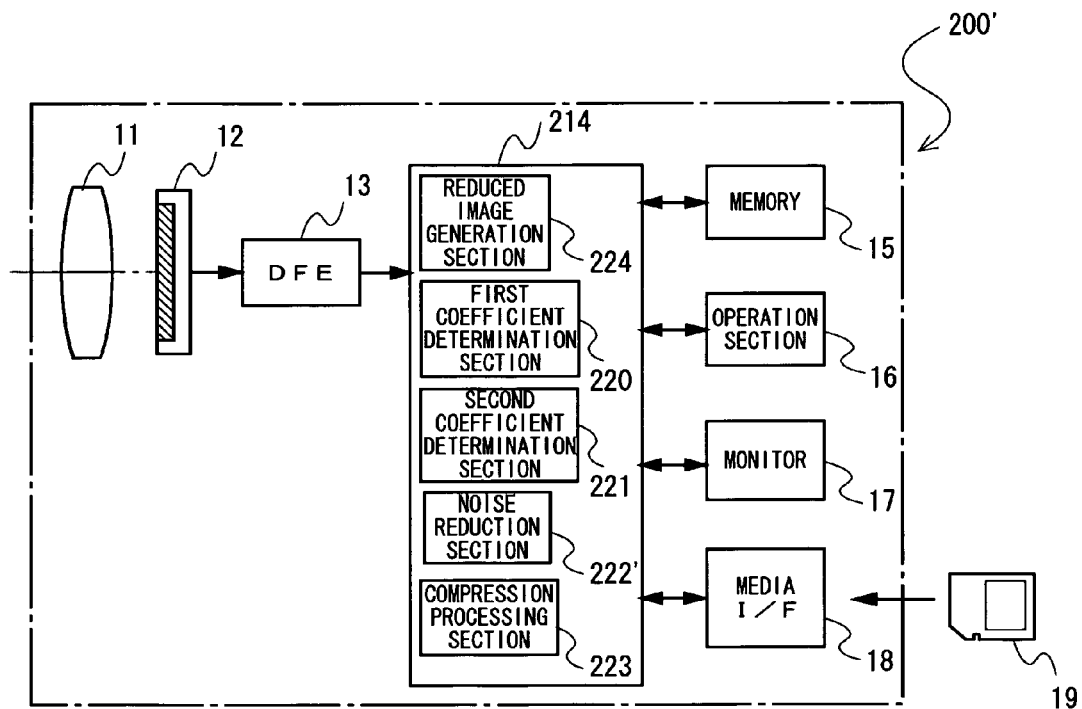
FIG. 17 is a block diagram illustrating an example of a configuration of a digital camera 200' according to a seventh embodiment.

FIG. 17 is a block diagram illustrating an example of a configuration of a digital camera 200' according to a seventh embodiment of the present application. In FIG. 17, a component of the digital camera 200' of the present embodiment which is the same as the component of the digital camera 200 of the sixth embodiment is denoted by the same reference numeral, and detailed explanation thereof will be omitted.

A different point between the digital camera 200' of the present embodiment and the digital camera 200 of the sixth embodiment is as follows.

1) When an image processing program is executed, the CPU 214 operates also as a reduced image generation section 224. The reduced image generation section 224 generates, by using a well-known method, a reduced image of each frame of a moving image captured by the image sensor 12. The reduced image generation section 224 of the present embodiment generates a reduced image of a frame of a target image at a reduction ratio of 1/4 (first reduced image). Further, the reduced image generation section 224 also generates a reduced image of a reference image at a reduction ratio of 1/4 (second reduced image). Note that the well-known method in the present embodiment is set to, for example, multiresolution analysis and Nearest Neighbor method.

2) When reducing a noise of the target image, a noise reduction section 222' first applies the modified recursive filter in the equation (7) to the reduced image of the target image and the reduced image of the reference image. Subsequently, the noise reduction section 222' determines a difference between the reduced images of the target image before and after the noise reduction is performed, thereby extracting noise data of a noise in a frequency band corresponding to the reduction ratio of 1/4 (referred to as a low frequency band, hereinafter). The noise reduction section 222' reduces the noise in the low frequency band superimposed on the original target image by using the noise data in the low frequency band, and by applying the equation (7) to the target image, it reduces a noise in a high frequency band superimposed on the target image itself.

Figure 18:
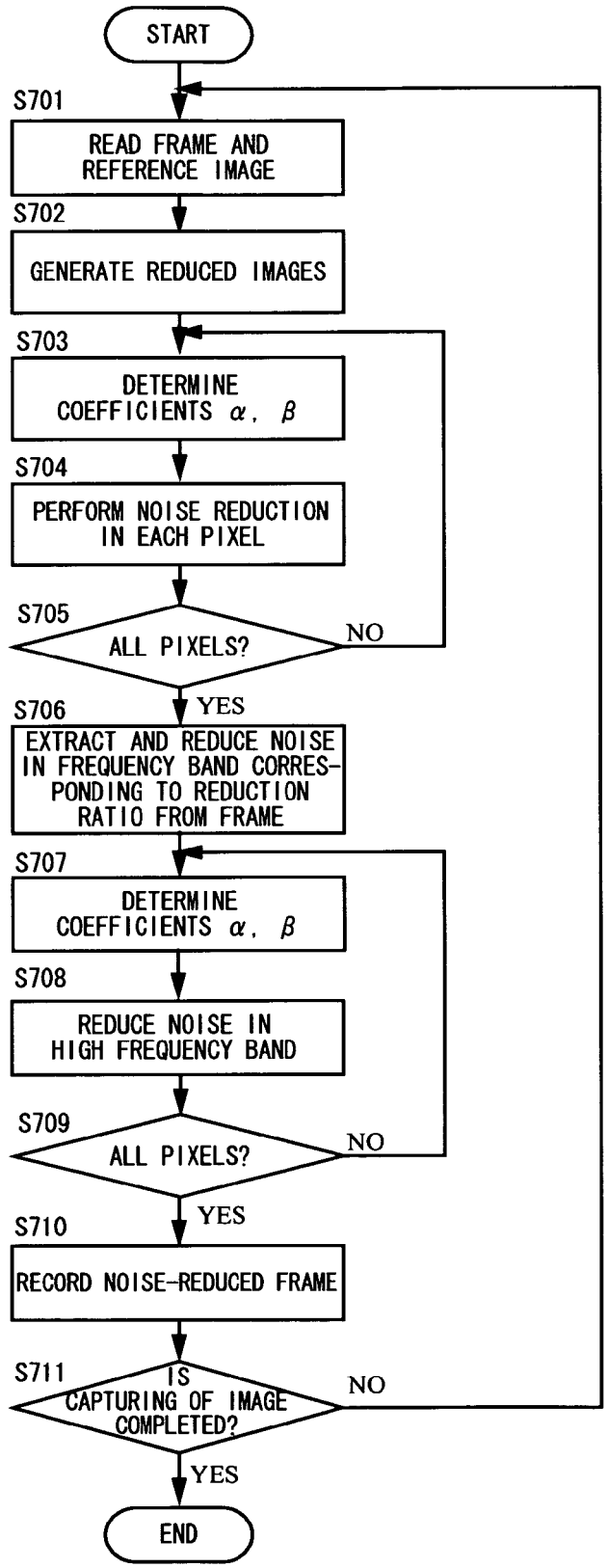
FIG. 18 is a flow chart illustrating an example of noise reduction processing performed by the digital camera 200' according to the seventh embodiment.
Figure 19:
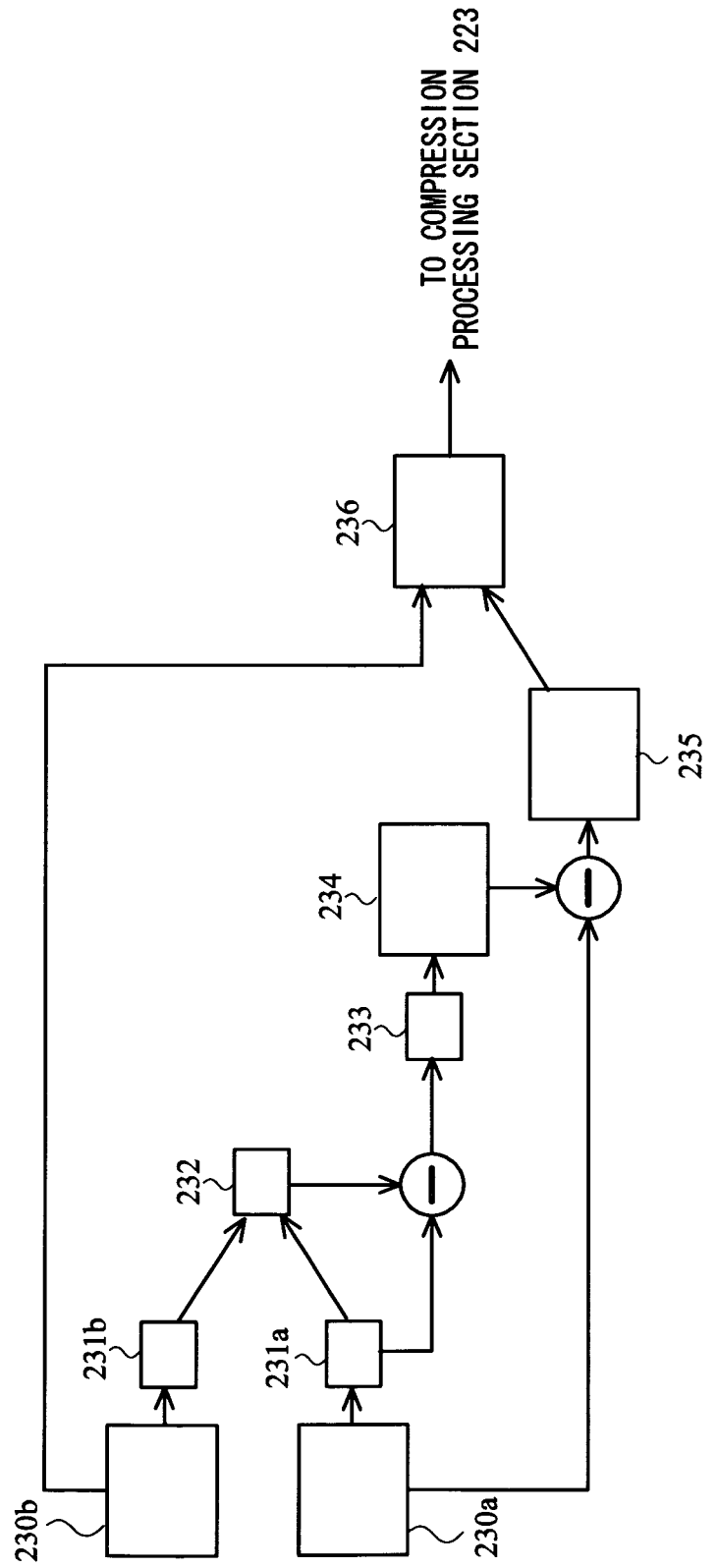
FIG. 19 is a diagram illustrating an example of a flow of image data in the noise reduction processing illustrated in FIG. 18.

Next, a processing operation performed by the digital camera 200' according to the present embodiment will be explained, while referring to a flow chart in FIG. 18 and a flow chart of image data in FIG. 19.

Upon receiving an instruction to capture a moving image from a user (a full depression operation of release button included in the operation section 16 or the like, for instance), the CPU 214 makes the image sensor 12 start capturing a moving image of a subject. The CPU 214 starts processing from step S701.

Step S701: The CPU 214 reads, via the DFE 13, a first frame (k=1) output from the image sensor 12 as a target image 230a. At the same time, the CPU 214 sets the target image 230a as a reference image 230b of noise reduction processing. Note that the reference image 230b with respect to the target image 230a of a second frame (k 2) or thereafter is set to a frame which is one frame before the target image and to which the noise reduction of the present embodiment is applied.

Step S702: The reduced image generation section 224 generates reduced images of each of the read target image 230a and reference image 230b at a reduction ratio of 1/4. In FIG. 19, the reduced image of the target image 230a with the reduction ratio of 1/4 is denoted by a reference numeral and letter 231a, and the reduced image of the reference image 230b with the reduction ratio of 1/4 is denoted by a reference numeral and letter 231b.

Step S703: The first coefficient determination section 220 calculates, for each color component, a difference in pixel values $Z_1 - Z_0$ in pixels i of the reduced image 231a of the target image 230a and the reduced image 231b of the reference image 230b, and determines a value of coefficient α (first coefficient) based on the function f in FIG. 15A. At the same time, the second coefficient determination section 221 calculates a brightness value $YB_1$ in the pixel i using the equations (8) and (9), and determines a value of coefficient β (second coefficient) based on the function G in FIG. 15B.

Step S704: The noise reduction section 222' applies the values of coefficients α, β determined in step S703 to the equation (7), thereby reducing a noise from the pixel value of each color component in the pixel i of the reduced image 231a.

Step S705: The noise reduction section 222' judges whether or not the noise reduction is performed on all pixels of the reduced image 231a. When the noise reduction is not performed on all of the pixels, the noise reduction section 222' proceeds to step S703 (NO side), and performs the processing in step S703 and step S704 on all of the pixels, to thereby reduce the noise from the reduced image 231a. Meanwhile, when the noise reduction is performed on all of the pixels, the noise reduction section 222' generates a reduced image 232 as a result of reducing a noise in a low frequency band corresponding to the reduction ratio of 1/4. The noise reduction section 222' determines a difference between the reduced image 231a and the reduced image 232, to thereby extract noise data 233 in the low frequency band superimposed on the reduced image 231a. The noise reduction section 222' proceeds to step S706 (YES side).

Step S706: The noise reduction section 222' converts the extracted noise data 233 into noise data 234 in the low frequency band in each pixel of the original target image 230a. The noise reduction section 222' subtracts a noise of the noise data 234 from a pixel value of each pixel of the target image 230a, thereby generating a target image 235 as a result of reducing the noise in the low frequency band. Note that the target image 235 includes a noise in a frequency band corresponding to the reduction ratio of 1/1 (referred to as a high frequency band, hereinafter).

Step S707: The first coefficient determination section 220 calculates, for each color component, a difference in pixel values $Z_1-Z_0$ in pixels i of the target image 235 and the reference image 230b, and determines a value of coefficient $\alpha$ (third coefficient) based on the function f in FIG. 15A. At the same time, the second coefficient determination section 221 calculates a brightness value $YB_1$ in the pixel i using the equations (8) and (9), and determines a value of coefficient $\beta$ (fourth coefficient) based on the function G in FIG. 15B.

Step S708: The noise reduction section 222' applies the values of coefficients $\alpha$, $\beta$ determined in step S707 to the equation (7), thereby reducing the noise in the high frequency band from the pixel value of each color component in the pixel i of the target image 235.

Step S709: The noise reduction section 222' judges whether or not the noise reduction in the high frequency band is performed on all pixels of the target image 235. When the noise reduction is not performed on all of the pixels, the noise reduction section 222' proceeds to step S707 (NO side), and performs the processing in step S707 and step S708 on all of the pixels, to thereby reduce the noise in the high frequency band from the target image 235. Meanwhile, when the noise reduction in the high frequency band is performed on all of the pixels, the CPU 214 generates a target image 236 as a result of reducing the noise in the low frequency band and the high frequency band, and proceeds to step S710 (YES side).

Step S710: The compression processing section 223 performs, in accordance with a moving image format such as H.264 and Motion JPEG, moving image compression on the target image 236 as a result of reducing the noise in the low frequency band and the high frequency band, thereby generating moving image data. The CPU 214 temporarily records the moving image data in the memory 15. At the same time, the CPU 214 records the target image 236 in the memory 15 to set it as the reference image 230b with respect to the target image 230a of the next frame.

Step S711: The CPU 214 judges whether or not it receives an instruction to terminate the capturing of moving image, based on a release of the full depression of release button of the operation section 16 made by the user, for example. When the CPU 214 receives the instruction to terminate the capturing of moving image (YES side), it generates a moving image file from the moving image data temporarily recorded in the memory 15, and records the file in the memory 15 or the storage medium 19. The CPU 214 terminates the series of processing. Meanwhile, when the CPU 214 does not receive the instruction to terminate the capturing of moving image, it proceeds to step S701 (NO side). The CPU 214 performs the processing from step S701 to step S709 with respect to the target image 230a of the second frame or thereafter, until it receives the instruction of termination.

As described above, in the present embodiment, since the coefficient $\alpha$ is determined from the difference in pixel values in each pixel of not only the target image 230a and the reference image 230b but also the images 231a, 231b being the reduced images thereof, and at the same time, the coefficient $\beta$ is determined by taking the brightness value in each pixel, namely, a state of brightness of the subject into consideration, the noise reduction can be highly accurately performed at a high speed even on a pixel with a high noise level.

Further, since the reduced images 231a, 231b are generated from the target image 230a and the reference image 230b, respectively, and the noise in the frequency band corresponding to the reduction ratio is sequentially extracted, the noise reduction can be conducted more efficiently.

Modified Example of Seventh Embodiment

A digital camera according to a modified example of the seventh embodiment of the present application is the same as the digital camera 200' according to the seventh embodiment illustrated in FIG. 17. Accordingly, detailed explanation of respective components that form the digital camera 200' of the present embodiment will be omitted.

Figure 20:
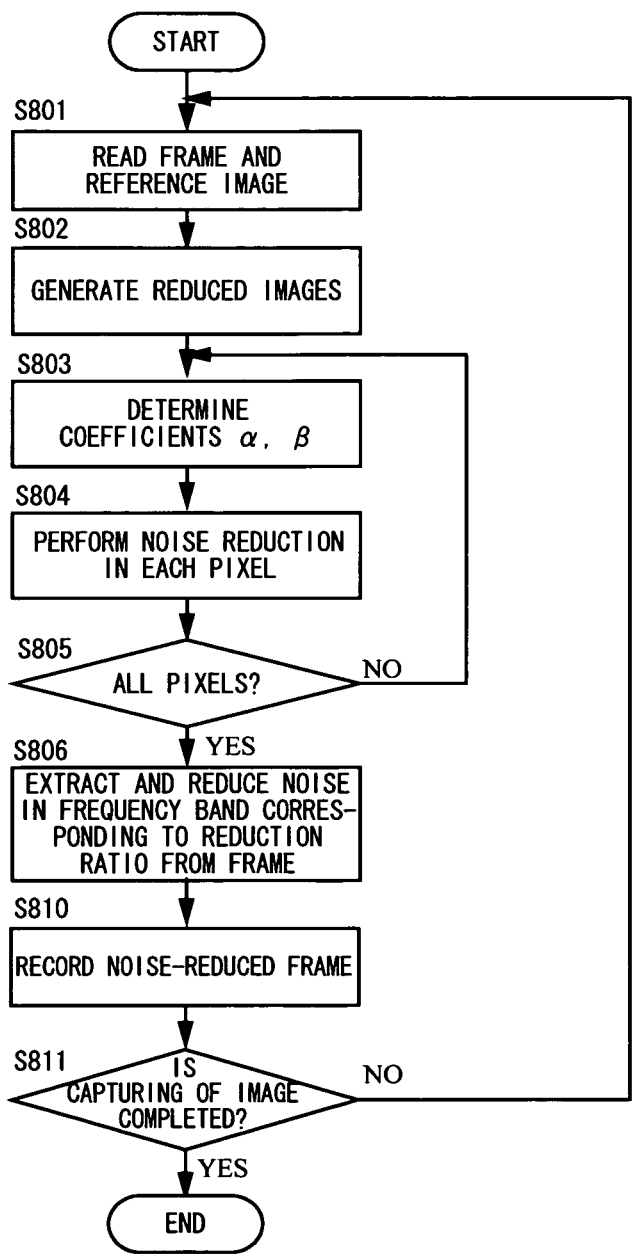
FIG. 20 is a flow chart illustrating an example of noise reduction processing performed by a digital camera 200' according to a modified example of the seventh embodiment.

FIG. 20 illustrates a flow chart of a processing operation performed by the digital camera 200' of the present embodiment. In FIG. 20, processing same as the processing in the seventh embodiment illustrated in FIG. 18 is denoted by a step number whose last two digits are the same as those of the step number of the processing in the seventh embodiment, and detailed explanation thereof will be omitted.

Figure 21:
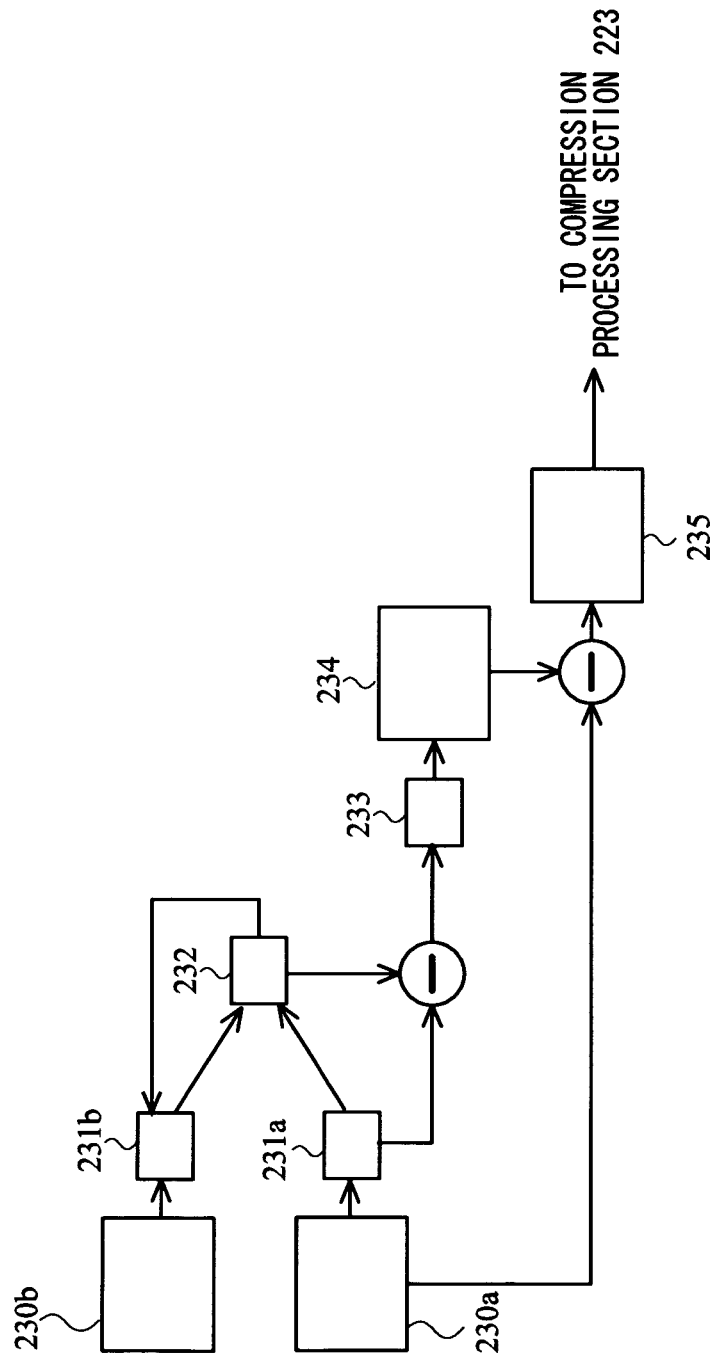
FIG. 21 is a diagram illustrating an example of a flow of image data in the noise reduction processing illustrated in FIG. 20.

FIG. 21 illustrates a flow of image data in the processing illustrated in FIG. 20. In FIG. 21, image data which are the same as the image data in the seventh embodiment illustrated in FIG. 19 are denoted by the same reference numerals and letters, and detailed explanation thereof will be omitted.

A point in which the processing operation performed by the digital camera 200' according to the present embodiment differs from the processing operation according to the seventh embodiment is that the noise reduction processing in the high frequency band from step S707 to step S709 is omitted. This is because moving image compression processing for converting the target image 235 into moving image data performed by the compression processing section 223 in step S810 (which corresponds to step S710) has an effect similar to that of reducing the noise in the high frequency band.

Further, since the processing from step S707 to step S709 is omitted, in the present embodiment, the target image 236 is not calculated, and the reduced image generation section 224 does not generate, in step S802, the reduced image 231b of the reference image 230b of the second frame or thereafter. Instead, in step S810, the CPU 214 of the present embodiment records the reduced image 232 in the memory 15 to set it as the reduced image 231b of the reference image 230b with the reduction ratio of 1/4. The CPU 214 reads, in step S801, the reduced image 231b from the memory 15.

As described above, in the present embodiment, since the coefficient $\alpha$ is determined from the difference in pixel values in each pixel of not only the target image 230a and the reference image 230b but also the images 231a, 231b being the reduced images thereof, and at the same time, the coefficient $\beta$ is determined by taking the brightness value in the pixel i, namely, a state of brightness of the subject into consideration, the noise reduction can be highly accurately performed at a high speed even on a pixel with a high noise level.

Further, since the reduced images 231a, 231b are generated from the target image 230a and the reference image 230b, respectively, and the noise in the frequency band corresponding to the reduction ratio is sequentially extracted, the noise reduction can be conducted more efficiently.

Further, by performing the moving image compression processing in substitution for the noise reduction in the high frequency band, it is possible to realize the reduction in the processing time of the noise reduction processing performed by the digital camera 200' and the reduction in the processing load, resulting in that a circuit scale of the digital camera 200' can be reduced.

Further, by omitting the generation processing of the reduced image of the reference image 230b of the second frame or thereafter performed by the reduced image generation section 224, it is possible to realize further reduction in the processing time of the noise reduction processing and further reduction in the processing load, which enables to further reduce the circuit scale of the digital camera 200'.

Supplemental Matters to Embodiments (1) The aforementioned first to third embodiments explain an example in which the respective processing performed by the reduced image generation section 20, the noise extraction section 21, the noise reduction section 22 and the compression processing section 23 in the digital camera 1, and the respective processing performed by the reduced image generation section 50, the noise extraction section 51, the noise reduction section 52 and the compression processing section 23 in the digital camera 1', are realized as software by the CPU 14, but, it is of course possible that these respective processing are realized as hardware by using an ASIC.

In like manner, the aforementioned fourth and fifth embodiments explain an example in which the respective processing performed by the reduced image generation section 120, the motion judgment section 121, the noise extraction section 122, the noise reduction section 123 and the compression processing section 124 in the digital camera 100, are realized as software by the CPU 114, but, it is possible that these respective processing are realized as hardware by using an ASIC.

Further, the aforementioned sixth and seventh embodiments explain an example in which the respective processing performed by the first coefficient determination section 220, the second coefficient determination section 221, the noise reduction section 222 and the compression processing section 223 in the digital camera 200, and the respective processing performed by the first coefficient determination section 220, the second coefficient determination section 221, the noise reduction section 222', the compression processing section 223 and the reduced image generation section 224 in the digital camera 200', are realized as software by the CPU 214, but, it is also possible that these respective processing are realized as hardware by using an ASIC.

(2) The image processing apparatus of the present application is not limited to an example of the digital camera of the aforementioned embodiments. For example, it is also possible to make a computer in which the image processing program stored in the computer readable medium or the like is previously installed function as the image processing apparatus of the present application, by making the computer read a moving image or a plurality of images captured through continuous shooting, and execute the processing of noise reduction.

(3) In the aforementioned first to third embodiments, the target image 30a is used as the reference image 30b with respect to the target image 30a of the first frame, but, the present application is not limited to this, and it is also possible to set the target image 30a to which well-known noise reduction processing is applied, as the reference image 30b, for instance.

In like manner, also in the aforementioned fourth and fifth embodiments, it is also possible to set the target image 130a to which well-known noise reduction processing is applied, as the reference image 130b.

(4) In the aforementioned first to third embodiments, the weighting coefficient w in the equation (1), the equation (3) and the equation (4) is set to the product of weighting coefficients of the spatial component wx, the pixel value component wd and the time component wt as represented by the equation (2), but, the present application is not limited to this. For example, it is also possible that the weighting coefficient w is set to a product of weighting coefficients of the spatial component wx and the pixel value component wd as represented by an equation (10), and a value of $\sigma_z$ of the pixel value component is set as represented by an equation (11).

$$w_j = wx_j \cdot wd_j \qquad (10)$$
$$= \exp\left(-\frac{|x_i - x_j|^2}{2\sigma_1^2}\right) \cdot \exp\left(-\frac{|d_i - d_j|^2}{2\sigma_2^2}\right)$$

$$\sigma_2 = \begin{cases} \sigma_2' & (i, j \in Sa) \\ \sigma_2'' & (i \in Sa, j \in Sb) \end{cases} \qquad (11)$$

As represented by the equation (10), by setting the value of $\sigma_2$ of the pixel value component based on whether or not the pixel i and the pixel j are in the same frame, it is possible to provide the same effect as that of the time component wt in the equation (2). Note that in the present embodiment, it is preferable to set that $\sigma'_2 \neq \sigma''_2$.

Further, it is also possible that the values of $\sigma_1$ of the spatial component and $\sigma_2$ of the pixel value component are set for each color component of RGB, YCrCb, HSV or the like. For example, when YCrCb is employed, $\sigma_1$ is set as 0.7/pixel and $\sigma_2$ is set as 30/8-bit image regarding a brightness Y, and $\sigma_1$ is set as 0.7/pixel and $\sigma_2$ is set as 10/8-bit image regarding color differences CrCb.

Further, it is also possible to use, for instance, an epsilon filter or the like, instead of the bilateral filter.

(5) In the aforementioned first to third embodiments, a threshold value is not provided in the calculation of weighting coefficient w, but, the present application is not limited to this, and it is also possible to provide the threshold value in the calculation of weighting coefficient w. For example, it is also possible that the CPU 14 judges, by setting a threshold value to $3\sigma_2$ in the calculation of weighting coefficient of the pixel value component wd in the equation (2), whether or not the subject is moved based on whether or not the value of $d_i - d_j$ becomes equal to or greater than the threshold value.

(6) In the aforementioned first to third embodiments, the reduced image generation section 20 generates the reduced images of each of the target image 30a and the reference image 30b at the reduction ratios of 1/4 and 1/16, and the reduced image generation section 50 generates the reduced image of the target image 30a at the reduction ratio of 1/4, with the use of the multiresolution analysis, but, the present application is not limited to this. It is also possible that the reduced image generation sections 20, 50 generate reduced images with one or more of different reduction ratios.

(7) In the aforementioned first embodiment and second embodiment, the noise reduction section 22 adds, in each pixel, the noise components of the noise data 35 in the low frequency band and the noise data 38 in the middle frequency band to calculate the noise data 39 in the low and middle frequency bands, and calculates the target image 41 as a result of reducing the noise components in the low and middle frequency bands, but, the present application is not limited to this. For example, the noise reduction section 22 calculates noise data in the respective frequency bands in each pixel of the original target image 30a from each of the noise data 35 in the low frequency band and the noise data 38 in the middle frequency band. Further, it is also possible that the noise reduction section 22 subtracts the noise data in the respective frequency bands from the original target image 30a, to thereby calculate the target image 41.

(8) In the aforementioned first embodiment, the CPU 14 reads the reference image 30b together with the target image 30a output from the image sensor 12, and the reduced image generation section 20 generates the reduced images of the target image 30a and the reference image 30b, but, the present application is not limited to this. For example, it is also possible that the CPU 14 stores the target image 42 in the memory 15 to set it as the reference image 30b, and at the same time, it records the reduced image 37 and the reduced image 33 in the memory 15 to set them as the reference image 31b with the reduction ratio of 1/4 and the reference image 32b with the reduction ratio of 1/16, respectively. Accordingly, the generation processing of the reduced images of the reference image 30b performed by the reduced image generation section 20 can be omitted, so that it is possible to realize the reduction in the processing time of the noise reduction processing and the reduction in the processing load. In addition, it is possible to reduce the circuit scale of the digital camera 1.

(9) In the aforementioned third embodiment, the reference image 30b with respect to the target image 30a of the second frame or thereafter is set to the frame which is one frame before the target image and to which the noise reduction is applied, but, the present application is not limited to this, and the reference image may also be a frame which is one frame before the target image and to which the noise reduction is not applied.

(10) In the aforementioned third embodiment, the noise reduction section 52 reduces the noise components in the low frequency band and the high frequency band, and then reduces the variation component in the time direction from the target image 30a, but, the present application is not limited to this. For example, the noise reduction section 52 may also reduce, after reducing the variation component in the time direction, the noise components in the low frequency band and the high frequency band from the target image 30a.

(11) In the aforementioned third embodiment, the reduction in the variation component in the time direction from the target image 64 is performed by using the equation (4), but, the present application is not limited to this, and the reduction may also be performed by using the equation (1) in the first embodiment.

Further, it is also possible to use, for example, an epsilon filter, a Gaussian filter, a well-type filter, a recursive filter or the like, instead of the bilateral filter.

Further, although all of the pixel values of the reference image 30b are used in the equation (4), the present application is not limited to this. For example, it is also possible to conduct the calculation in the equation (4) by using only the pixel values of an area in which a pixel position of pixel of the reference image 30b corresponding to the pixel i of the target image 64 is set as a center. Accordingly, it is possible to enhance the processing speed. Note that a size of the area is preferably about 1 pixel×1 pixel to 11 pixels×11 pixels, and is preferably set in accordance with a size of the target image, a required processing speed and the like.

(12) In the aforementioned third embodiment, the noise reduction section 52 reduces, in step S308, the noise component in the high frequency band and the variation component in the time direction superimposed on the target image 63, but, the present application is not limited to this. For example, it is also possible that the noise reduction section 52 reduces only the variation component in the time direction superimposed on the target image 63, and the compression processing section 23 reduces, in step S309, the noise component in the high frequency band through the moving image compression processing. Accordingly, it is possible to realize further reduction in the processing time of the noise reduction processing performed by the digital camera 1' and further reduction in the processing load, and at the same time, the circuit scale of the digital camera 1' can be reduced.

(13) In the aforementioned fourth and fifth embodiments, the weighting coefficient w in the equation (5) is set to the product of weighting coefficients of the spatial component wx, the pixel value component wd and the time component wt as represented by the equation (6), but, the present application is not limited to this. For example, it is also possible that the weighting coefficient w is set to a product of weighting coefficients of the spatial component wx and the pixel value component wd as represented by an equation (12), and a value of $\sigma_2$ of the pixel value component is set as represented by an equation (13).

$$w_j = wx_j \cdot wd_j \qquad (12)$$
$$= \exp\left(-\frac{|x_i - x_j|^2}{2\sigma_1^2}\right) \cdot \exp\left(-\frac{|ds_i(i) - d_i(j)|^2}{2\sigma_2^2}\right)$$

$$\sigma_2 = \begin{cases} \sigma'_2 & (i \text{ and } j \text{ are pixels in the same frame}) \\ \sigma''_2 & (i \text{ and } j \text{ are pixels in different frames}) \end{cases} \qquad (13)$$

As represented by the equation (13), by setting the value of $\sigma_2$ of the pixel value component based on whether or not the pixel i and the pixel j are in the same frame, it is possible to provide the same effect as that of the time component wt in the equation (6). Note that in the present embodiments, it is preferable to set that $\sigma'_2 \neq \sigma''_2$.

Further, it is also possible that the values of $\sigma_1$ of the spatial component and $\sigma_2$ of the pixel value component are set for each color component of RGB, YCrCb or the like. For example, when YCrCb is employed, $\sigma_1$ is set as 0.7/pixel and $\sigma_2$ is set as 30/8-bit image regarding a brightness Y, and $\sigma_1$ is set as 0.7/pixel and $\sigma_2$ is set as 10/8-bit image regarding color differences CrCb.

Further, it is also possible to use, for instance, an epsilon filter or the like, instead of the bilateral filter.

Further, it is also possible that the value of each of $\sigma'_2$ and $\sigma''_2$ is determined in accordance with a magnitude of the absolute value $|\langle ds_f \rangle - \langle dr_f \rangle|$ of the difference between the average values achieved by the motion judgment section 121, and the weighting is performed on the current frame and the past frame in the weighted average processing in the equations (12) and (13). Specifically, it is also possible that the value of $\sigma'_2$ is determined in accordance with the magnitude of the absolute value $|\langle ds_i\rangle - \langle dr_i\rangle|$ of the difference between the average values, and the value of $\sigma''_2$ is determined based on the value of $\sigma'_2$, for example.

(14) In the aforementioned fourth and fifth embodiments, the reduced image generation section 120 generates the reduced images of each of the target image 130a and the reference image 130b at the reduction ratios of 1/4 and 1/16, with the use of the multiresolution analysis, but, the present application is not limited to this. It is also possible that the reduced image generation section 120 generates reduced images with one or three or more of different reduction ratios.

(15) In the aforementioned fourth and fifth embodiments, the noise reduction section 123 adds, in each pixel, the noise components of the noise data 135 in the low frequency band and the noise data 138 in the middle frequency band to calculate the noise data 139 in the low and middle frequency bands, and calculates the target image 141 as a result of reducing the noise components in the low and middle frequency bands, but, the present application is not limited to this. For example, the noise reduction section 123 calculates noise data in the respective frequency bands in each pixel of the original target image 130a from each of the noise data 135 in the low frequency band and the noise data 138 in the middle frequency band. Further, it is also possible that the noise reduction section 123 subtracts the noise data in the respective frequency bands from the original target image 130a, to thereby calculate the target image 141.

(16) In the aforementioned fourth embodiment, the CPU 114 reads the reference image 130b together with the target image 130a output from the image sensor 12, and the reduced image generation section 120 generates the reduced images of the target image 130a and the reference image 130b, but, the present application is not limited to this. For example, it is also possible that the CPU 114 stores the target image 142 in the memory 15 to set it as the reference image 130b, and at the same time, it records the reduced image 137 and the reduced image 133 in the memory 15 to set them as the reference image 131b with the reduction ratio of 1/4 and the reference image 132b with the reduction ratio of 1/16, respectively. Accordingly, the generation processing of the reduced images of the reference image 130b performed by the reduced image generation section 120 can be omitted, resulting in that the reduction in the processing time of the noise reduction processing and the reduction in the processing load can be realized. In addition, it is possible to reduce the circuit scale of the digital camera 100.

(17) In the aforementioned sixth and seventh embodiments, the value of threshold value Th1 is set to the same value for each color component of RGB, but, the present application is not limited to this. It is also possible to set the value of threshold value Th1 which is different for each component. Further, it is also possible to perform conversion from RGB into YCrCb based on the equations (8) and set the threshold value Th1 for each of the brightness component and the color difference components. For example, by setting the value of threshold value of the color difference components Cr, Cb to a large value such as one 1.5 times larger than the threshold value of the brightness component Y to strongly apply the noise reduction to the color difference components Cr, Cb, it is possible to make the color noise less noticeable.

Further, it is also possible that the value of threshold value Th2 is also set to a value different for each color component or brightness component and color difference components.

(18) In the aforementioned sixth and seventh embodiments, the target image is used as the reference image with respect to the target image of the first frame, but, the present application is not limited to this, and it is also possible to set an image as a result of applying well-known noise reduction processing to the target image, as the reference image.

(19) In the aforementioned sixth embodiment, when the pixel value included in the pixel i corresponds to RGB components, the brightness value in the pixel i is set to be calculated using the well-known method in the equations (8), but, the present application is not limited to this, and it is also possible to use the pixel value of the color component of either R, G or B such as a G component, as the brightness value.

(20) In the aforementioned seventh embodiment, the reduced image generation section 224 generates the reduced images of each of the target image 230a and the reference image 230b at the reduction ratio of 1/4, with the use of the multiresolution analysis, but, the present application is not limited to this. It is also possible that the reduced image generation section 224 generates reduced images with two or more of different reduction ratios.

Note that when the reduced images with two or more of different reduction ratios are generated, on the reduced image, not only the noise in the frequency band corresponding to its own reduction ratio but also the noise in the lower frequency band included in the smaller reduced image is superimposed. Accordingly, the noise reduction section 222' preferably starts performing processing on the reduced image with the minimum reduction ratio first, so that it can efficiently extract, from each of the reduced images, the noise in the frequency band corresponding to the reduction ratio of each of the reduced images.

(21) In the aforementioned seventh embodiment, the CPU 214 reads the reference image 230b together with the target image 230a output from the image sensor 12, and the reduced image generation section 224 generates the reduced images of the target image 230a and the reference image 230b, but, the present application is not limited to this. For example, it is also possible that the CPU 214 stores the target image 236 in the memory 15 to set it as the reference image 230b, and at the same time, it records the reduced image 232 in the memory 15 to set it as the reference image 231b with the reduction ratio of 1/4. Accordingly, the generation processing of the reduced image of the reference image 230b performed by the reduced image generation section 224 can be omitted, resulting in that the reduction in the processing time of the noise reduction processing and the reduction in the processing load can be realized. In addition, it is possible to reduce the circuit scale of the digital camera 200'.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
a reduced image generation section generating, at least at one reduction ratio: (i) a first reduced image obtained by reducing a target image, which is a target of noise reduction processing, and (ii) a second reduced image obtained by reducing a reference image at a same reduction ratio as a reduction ratio of the first reduced image;
a noise extraction section extracting a noise component in a frequency band corresponding to the reduction ratio of the first reduced image by using the first reduced image and the second reduced image; and a noise reduction section reducing the noise component in the frequency band from a pixel value of each pixel of the target image based on the noise component in the frequency band extracted by the noise extraction section;

wherein when a plurality of pairs of the first reduced image and the second reduced image are generated at a plurality of reduction ratios, the noise extraction section sequentially extracts the noise component in the frequency band from a pair whose reduction ratio corresponds to a minimum reduction ratio.

2. The image processing apparatus according to claim 1, wherein the noise extraction section performs a weighted average processing on a pixel value of each pixel of the first reduced image by using the first reduced image and the second reduced image, and extracts the noise component in the frequency band from a difference between the pixel value of each pixel and a weighted averaged pixel value of the first reduced image.

3. The image processing apparatus according to claim 2, wherein the weighted average processing is performed by using at least one of a bilateral filter and an epsilon filter.

4. The image processing apparatus according to claim 1, wherein the noise reduction section performs, by using the reference image and the target image, a weighted average processing on the pixel value of each pixel of the target image, and reduces a noise component in a high frequency band in each pixel of the target image.

5. The image processing apparatus according to claim 1, further comprising a compression processing section performing an image compression on the target image;

wherein the noise reduction section reduces the noise component in a high frequency band.

6. The image processing apparatus according to claim 1, wherein the noise reduction section integrates the noise component in the frequency band extracted from each of the plurality of pairs at each pixel of the target image, and reduces the noise component being integrated from the pixel value of each pixel of the target image.

7. The image processing apparatus according to claim 1, wherein when a plurality of first reduced images are generated at a plurality of reduction ratios, the noise extraction section sequentially extracts the noise component from a noise component in a frequency band corresponding to a minimum reduction ratio of a first reduced image of the plurality of reduced images.

8. The image processing apparatus according to claim 1, wherein the noise extraction section performs a weighted average processing on a pixel value of each pixel of the first reduced image, and extracts the noise component in the frequency band from a difference between the pixel value of each pixel and a weighted averaged pixel value of the first reduced image.

9. The image processing apparatus according to claim 1, wherein the noise reduction section performs, by using the target image, a weighted average processing on the pixel value of each pixel of the target image from which the noise component in the frequency band is reduced, and reduces a noise component in a high frequency band in each pixel of the target image.

10. The image processing apparatus according to claim 1, wherein the noise reduction section performs, by using the target image and the reference image, a weighted average processing on the pixel value of each pixel of the target image, and reduces a variation component in a time direction in each pixel of the target image.

11. The image processing apparatus according to claim 10, wherein the noise reduction section reduces, in the reference image, the variation component in the time direction by using pixel values in an area in which a position of a pixel corresponding to each pixel of the target image is set as a center.

12. The image processing apparatus according to claim 1, wherein:

the target image is one of continuously captured images; and the reference image is an image captured before the target image and to which the noise reduction processing has been applied.

13. An imaging apparatus, comprising:

an imaging section generating images by capturing a subject image; and the image processing apparatus according to claim 1.

14. A non-transitory computer readable medium storing an image processing program that makes a computer execute:

an input step reading a target image being a target of noise reduction processing and a reference image to be a reference of the noise reduction processing;

a reduced image generation step generating, at least at one reduction ratio: a first reduced image obtained by reducing the target image and a second reduced image obtained by reducing the reference image at a same reduction ratio as a reduction ratio of the first reduced image;

a noise extraction step extracting a noise component in a frequency band corresponding to the reduction ratio of the first reduced image by using the first reduced image and the second reduced image; and a noise reduction step reducing the noise component in the frequency band from a pixel value of each pixel of the target image based on the noise component in the frequency band extracted by the noise extraction step;

wherein when a plurality of pairs of the first reduced image and the second reduced image are generated at a plurality of reduction ratios, the noise extraction step sequentially extracts the noise component in the frequency band from a pair whose reduction ratio corresponds to a minimum reduction ratio.

* * * * *